(12) United States Patent
Miyamoto et al.

(10) Patent No.: US 10,509,412 B2
(45) Date of Patent: Dec. 17, 2019

(54) MOVABLE BODY CONTROL SYSTEM

(71) Applicant: HONDA MOTOR CO., LTD., Tokyo (JP)

(72) Inventors: Shugo Miyamoto, Wako (JP);
Takamasa Koshizen, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 15/890,645

(22) Filed: Feb. 7, 2018

(65) Prior Publication Data
US 2018/0253104 A1 Sep. 6, 2018

(30) Foreign Application Priority Data

Mar. 2, 2017 (JP) .................................. 2017-039235

(51) Int. Cl.
*G05D 1/02* (2006.01)
*G01S 5/02* (2010.01)

(52) U.S. Cl.
CPC ......... *G05D 1/0234* (2013.01); *G05D 1/0221* (2013.01); *G05D 1/0223* (2013.01); *G05D 1/0238* (2013.01); *G05D 1/0274* (2013.01); *G05D 2201/0213* (2013.01)

(58) Field of Classification Search
CPC .. G05D 1/0234; G05D 1/0272; G05D 1/0282; G05D 1/0274; G05D 1/0221; G05D 1/0223; G05D 1/0238; G05D 2201/026; G05D 2201/0213
USPC .......................................................... 701/25
See application file for complete search history.

(56) References Cited

U.S. PATENT DOCUMENTS

| | | | | |
|---|---|---|---|---|
| 6,101,443 A | * | 8/2000 | Kato ................... | G01C 21/3415 340/995.21 |
| 6,349,259 B1 | * | 2/2002 | Sato ........................ | G01C 21/28 340/988 |
| 2013/0006477 A1 | * | 1/2013 | Baba ................... | B60R 21/0132 701/45 |

FOREIGN PATENT DOCUMENTS

| JP | 2006-209641 | 8/2006 |
|---|---|---|
| JP | 2016-170005 | 9/2016 |

OTHER PUBLICATIONS

Japanese Office Action with English translation dated Jan. 8, 2019, 7 pages.

\* cited by examiner

*Primary Examiner* — Marthe Y Marc-Coleman
(74) *Attorney, Agent, or Firm* — Rankin, Hill & Clark LLP

(57) ABSTRACT

A movable body control system includes a movable body including a beacon receiver for receiving beacon radio waves from a plurality of beacon transmitters installed around a traveling road, and at least one processing equipment configured to generate a model for determining a position of the movable body based on a distribution of time-series measurement values of beacon radio wave reception intensities in the beacon receiver and to control travel of the movable body while determining an area in which the movable body travels at present based on a distribution of time-series measurement values of the beacon radio wave reception intensities at present and the model.

16 Claims, 17 Drawing Sheets

FRONT VIEW

LEFT SIDE VIEW

MOVABLE BODY CONTROL SYSTEM

INCORPORATION BY REFERENCE

The present application claims priority under 35 U.S.C. § 119 to Japanese Patent Application No. 2017-039235 filed on Mar. 2, 2017. The content of the application is incorporated herein by reference in its entirety.

BACKGROUND OF THE INVENTION

Field of the Invention

The present invention relates to a movable body control system that controls travel of a movable body, and particularly relates to a movable body control system that determines a position of a movable body based on signals outputted from beacon transmitters installed around a traveling road, and controls travel of the movable body.

Description of the Related Art

There has been conventionally known a system that causes a vehicle to travel automatically by detecting a line (a white line or the like) drawn on a traveling road, and performing line tracing along the white line (refer to Japanese Patent Laid-Open No. 2006-209641). Further, there has been also known a system that causes a vehicle to travel automatically along a road determined on a map while determining an own vehicle position by a GNSS (Global Navigation Satellite System).

However, in the system using line tracing, automatic travel is performed based on only a line without detecting an own vehicle position, so that when the own vehicle deviates from the line due to a thin spot of the white line and the like, it is difficult for the system itself to return the vehicle to an original traveling road. Further, in the system using a GNSS, the own vehicle position cannot be properly determined in a place where a radio wave reception environment is bad (for example, indoor or underground parking lot, a tunnel or the lie), and it becomes difficult to perform suitable automatic traveling. Even in a place where the GNSS radio wave environment is favorable, in a system using both a GNSS and inertial navigation, position determination by inertial navigation can be difficult in a spiral traveling road or the like that connects respective floors of a building parking lot composed of a plurality of floors, for example.

Meanwhile, there is known a system in which a plurality of beacon transmitters are installed, for example, at regular intervals in a traveling road area, and by receiving radio waves from these beacon transmitters by the traveling vehicle, automatic travel control of the vehicle is performed while the position of the vehicle is determined. In this system, when reception intensity of the radio wave received by the vehicle exceeds a predetermined threshold value, it is determined that the vehicle approaches the beacon transmitter which is a source of transmission of the radio wave, and thereby the position of the vehicle is determined.

However, in the conventional system using beacons (or radio waves from Wi-Fi® access points, or BLE (Bluetooth® Low Energy) transmitters, or the like), when there is a difference in the sensitivity of the reception device (terminal device) which receives beacon radio waves for each vehicle, the radio wave reception intensity becomes different in each vehicle, so that a model for determining the position from a beacon radio wave has to be created for each vehicle (or each terminal device loaded on a vehicle) (for example, refer to Japanese Patent Laid-Open No. 2016-170005).

Further, in the place where radio wave reflection occurs at obstacles such as a building and a wall, reflection of beacon radio waves and interference between beacon radio waves and radiation electromagnetic waves that are generated from a drive device of an own vehicle and reflected may result in an error in a measurement value of the reception intensity of a beacon radio wave and position determination can sometimes become difficult. Further, in the above described conventional system, the own vehicle position is determined for the first time only when the vehicle approaches the beacon to a position in which the radio wave reception intensity exceeds a predetermined threshold value, so that depending on the mode of disposition of the beacons (for example, the shape (a curve, bend or the like) of the traveling road in the beacon disposition position), a change in the speed, and changes in acceleration and deceleration in automatic travel control become steep, and comfortableness of vehicle occupants can be resultantly lost.

SUMMARY OF THE INVENTION

Due to the above described background, in a movable body control system that controls travel of a movable body while performing position determination of the movable body by using beacon radio waves from beacon transmitters placed in a traveling road, it is desired to control travel of an arbitrary movable body by a common model, without creating a model for the position determination for each movable body. Further, it is desired that the common model like this can determine a present position properly even if there is radio wave reflection by an obstacle such as a wall around a traveling road, and can realize smooth travel without occurrence of a steep speed change and a steep acceleration change just in front of the beacon transmitters.

One aspect of the present invention is a movable body control system, including a plurality of beacon transmitters disposed around a traveling road on which a movable body travels, a movable body including beacon reception means for receiving beacon radio waves from the plurality of beacon transmitters, model generation means for generating a model for determining a position of the movable body based on beacon radio wave reception intensities of the beacon radio waves from the plurality of beacon transmitters, which are received by the beacon reception means, and travel control means for controlling travel of the movable body. In the system, the model is for determining an area in which the movable body travels based on a distribution of time-series measurement values of the beacon radio wave reception intensities, and the travel control means controls the travel of the movable body while determining an area in which the movable body travels at present, based on a distribution of the time-series measurement values at present of the beacon radio wave reception intensities and the model.

According to another aspect of the present invention, storage means for storing map information including information on a route of the traveling road and a three-dimensional shape of surroundings including the traveling road is included, wherein the map information includes information on areas obtained by dividing the traveling road based on three-dimensional shape features of the surroundings, and information on the three-dimensional shape features about the areas, and the travel control means also controls the travel of the movable body based on the information on the three-dimensional shape features about the areas.

According to another aspect of the present invention, the movable body includes detection means for detecting an obstacle present in a surrounding environment of the movable body, and the travel control means also controls the travel of the movable body based on information on the obstacle detected by the detection means.

According to another aspect of the present invention, the model is used in the arbitrary movable body different from the movable body which is used in generation of the model, and travel of the arbitrary movable body is controlled.

According to another aspect of the present invention, the travel control means also controls the travel of the movable body based on odometry based on a travel distance and a traveling direction of the movable body.

According to another aspect of the present invention, the travel control means plans a speed of the movable body and/or a change rate of the speed so that acceleration, deceleration and/or jerk of the movable body do not exceed predetermined upper limit values respectively, and determines a target speed of the movable body in accordance with the plan.

According to another aspect of the present invention, the movable body is an automobile.

According to still another aspect of the present invention, the movable body is a wheelchair.

Another aspect of the present invention is a movable body control method executed by a movable body control system including a plurality of beacon transmitters disposed around a traveling road on which a movable body travels, a movable body including beacon reception means for receiving beacon radio waves from the plurality of beacon transmitters, model generation means for generating a model for determining a position of the movable body based on beacon radio wave reception intensities of the beacon radio waves from the plurality of beacon transmitters, which are received by the beacon reception means, and travel control means for controlling travel of the movable body. The model is for determining an area in which the movable body travels based on a distribution of time-series measurement values of the beacon radio wave reception intensities, and the movable body control method includes the steps of generating the model by the model generation means, receiving the beacon radio waves from the plurality of beacon transmitters by the beacon reception means, determining the area in which the movable body travels at present by the travel control means, based on the distribution of the time-series measurement values of present beacon radio wave reception intensities that are reception intensities of the beacon radio waves from the plurality of beacon transmitters which are receives in the receiving step, and the model, and controlling travel of the movable body by the travel control means, based on the area where the movable body travels at present and which is determined by the determining step.

DETAILED DESCRIPTION OF PREFERRED EMBODIMENT

Hereinafter, an embodiment of the present invention will be described with reference to the drawings.

Figure 1:
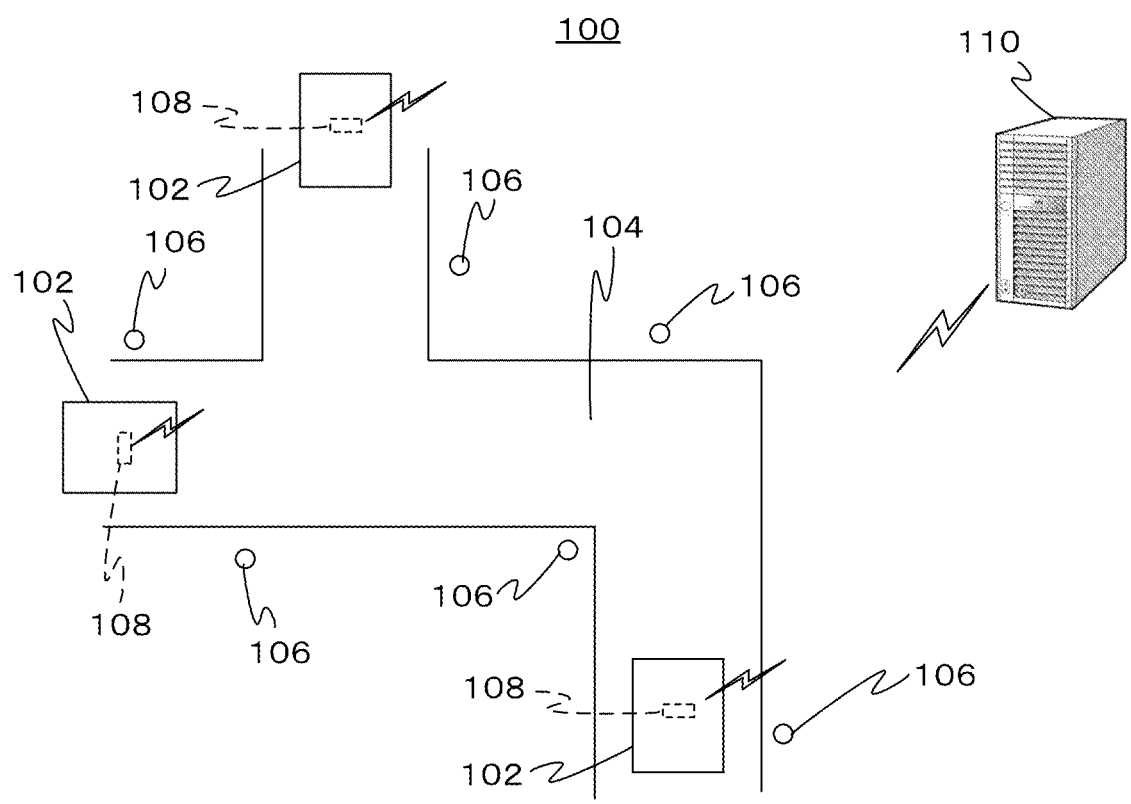
FIG. 1 is a view illustrating a configuration of a movable body control system according to an embodiment of the present invention.

FIG. 1 is a view illustrating a general configuration of a movable body control system according to an embodiment of the present invention. The movable body control system 100 includes one or a plurality of movable bodies 102 that are electric wheelchairs, a plurality of beacon transmitters 106 installed around a traveling road 104 of the movable body 102, and a server 110. Further, each of the movable bodies 102 includes a movable body control device 108 that is communicably connected to the server 110.

In the present embodiment, the movable body 102 is assumed to be an electric wheelchair as an example, but the movable body that configures the movable body control system according to the present invention is not limited to this. For example, the movable body 102 can be widely assumed to be a movable body in general that includes a drive device and a steering device, such as an automobile, an electric cart, and an electric truck in a factory.

Transmission frequencies and installation positions of the beacon transmitters 106 are set so as to have different frequencies respectively at least in a range where arrival ranges of mutual radio waves overlap one another. The server 110 stores the transmission frequencies and installation position coordinates (for example, altitudes and longitudes) of the respective beacon transmitters 106.

The movable body control device 108 receives radio waves of the beacon transmitters 106 that are present around the movable body 102, and transmits information on the frequencies and reception intensities of the received radio waves and the like to the server 110 at predetermined time intervals. Further, the movable body control device 108 receives information on a target speed and a target steering angle from the server 110 and causes the movable body 102 to travel The server 110 can be a cloud server that is connected to the movable body control device 108 via a wireless network or the like, for example, or a server that is provided inside a facility including the traveling road 104 of the movable body 102.

Figure 2A:
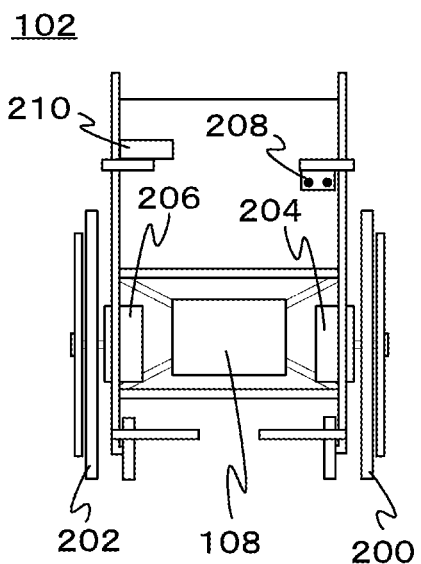
FIG. 2A is a front view illustrating a configuration of a movable body that is an electric wheelchair configuring the movable body control system illustrated in FIG. 1.
Figure 2B:
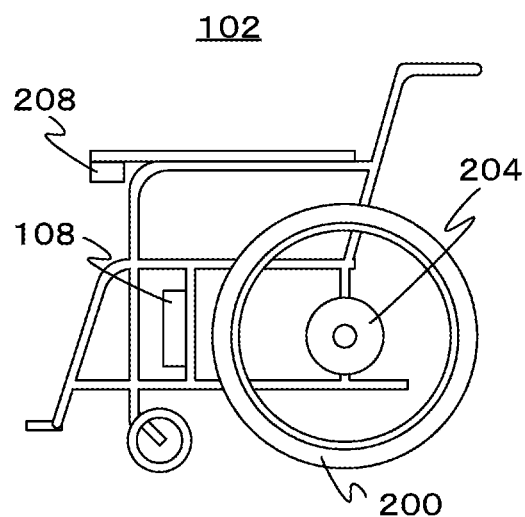
FIG. 2B is a left side view illustrating a configuration of the movable body that is the electric wheelchair configuring the movable body control system illustrated in FIG. 1.

FIG. 2A and FIG. 2B are respectively a front view and a left side view of the movable body 102. The movable body 102 includes a left drive motor 204 that drives a left drive wheel 200, and a right drive motor 206 that drives a right drive wheel 202. The left drive motor 204 and the right drive motor 206 are drive devices that move the movable body 102, and are also steering devices that turn the movable body 102 in a left and right direction by making mutual rotational speeds different from each other.

Further, in the present embodiment, the left drive motor 204 and the right drive motor 206 respectively include rotation angle sensors (not illustrated) that output signal pulses (rotation signal pulses) each time the left drive motor 204 and the right drive motor 206 rotate by predetermined rotation angles, and the movable body control device 108 can calculates distances by which the left drive wheel 200 and the right drive wheel 202 travel by receiving the signal pulses respectively from the left drive motor 204 and the right drive motor 206.

Further, the movable body 102 is provided with a stereo camera 208 that captures an image of an environment in front of the movable body 120, and an input device 210 for an occupant to set a destination or the like. The input device 210 can be, for example, a switch box, or a display device which has a touch panel (for example, a touch screen device, a smartphone or the like) and which is capable of displaying map and of receiving input from a user.

Figure 3:
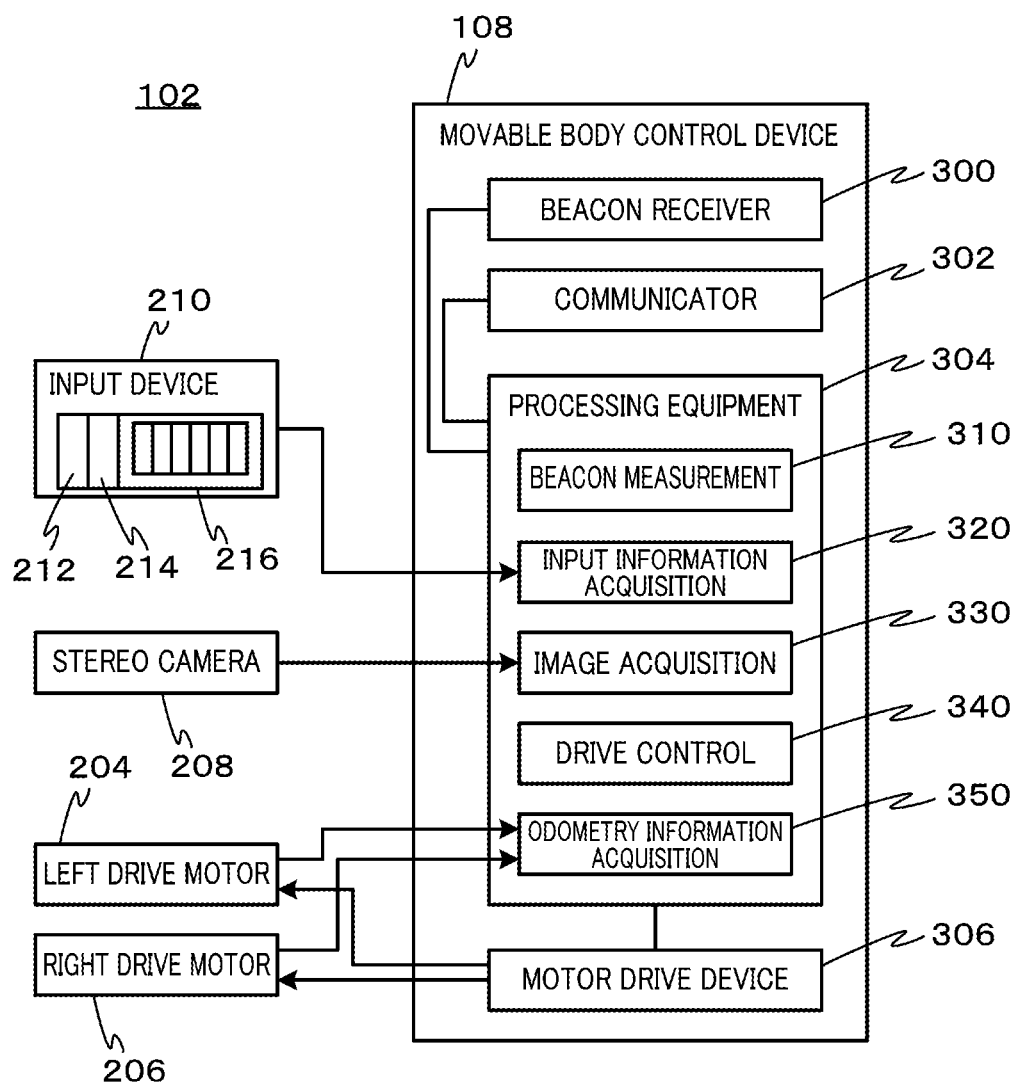
FIG. 3 is a block diagram illustrating a configuration of the movable body illustrated in FIG. 2A and FIG. 2B.

FIG. 3 is a block diagram illustrating a configuration of the movable body 102. In the present embodiment, the input device 210 is a switch box, which includes a learning switch 212, a travel switch 214, and a destination selection switch 216.

In the present embodiment, the user disposes the movable body 120 in any one of a plurality of guidance start positions set in advance and turns on the learning switch 212, whereby a learning mode operation of the movable body control system 100 is started. Further, the user disposes the movable body 102 in any one of the plurality of guidance start positions set in advance and turns on the travel switch 214, whereby a working mode operation of the movable body control system 100 is started. In the working mode operation, after operating the travel switch 214, the user selects a destination with the destination selection switch 216, whereby autonomous travel control to the selected destination from the guidance start position is started. The destination selection switch 216 is configured by a plurality of switches, and destinations set in advance (for example, "front of elevator No. 1", "front of a dining room", "front of a lounge" and the like) are associated with the respective switches, and by turning on any one of the switches, a destination corresponding to the switch is selected.

The movable body control device 108 includes a beacon receiver 300 that receives radio waves from the beacon transmitters 106, a communicator 302 that is, for example, a wireless communication device for communicating with the server 110, processing equipment 304 and a motor drive device 306.

The processing equipment 304 is a computer having a processor such as a CPU (Central Processing Unit), a ROM (Read Only Memory) in which a program is written, a RAM (Random Access Memory) for temporarily storing data and the like, and has a beacon measurement unit 310, an input information acquisition unit 320, an image acquisition unit 330, a drive control unit 340, and an odometry information acquisition unit 350.

The above described respective units included in the processing equipment 304 are realized by the processing equipment 304 which is a computer, executing programs, and the computer programs can be stored in an arbitrary storage medium which is computer-readable. Alternatively or additionally, all or some of the above described respective units also can be configured by hardware including one or more electronic circuit components respectively.

The beacon measurement unit 310 measures a reception intensity of a beacon radio wave received by the beacon receiver 300 from each of the beacon transmitters 106 around the movable body 102 for each beacon radio wave (that is, for each of frequencies of the received beacon radio waves), and transmits beacon reception information including measurement values and measuring times of the reception intensities to the server 110 via the communicator 302 at regular time intervals.

The input information acquisition unit 320 monitors on/off states of the learning switch 212, the travel switch 214, and the destination selection switch 216 which are included in the input device 210. When the processing equipment 304 detects by the input information acquisition unit 320 that the learning switch 212 is turned on, the processing equipment 304 transmits a learning start request signal attached with an identification ID of the own device to the server 110 via the communicator 302, and executes learning data transmission processing (described later). Further, when the processing equipment 304 detects by the input information acquisition unit 320 that the travel switch 214 is turned on, the processing equipment 304 transmits a travel control start request signal attached with the identification ID of the own device to the server 110 via the communicator 302, and executes travel data transmission processing and travel processing (both will be described later). Furthermore, when the processing equipment 304 detects by the input information acquisition unit 320 that any one of switches of the destination selection switch 216 is turned on, the processing equipment 304 transmits, to the server 110, destination information which is attached with the identification ID of the own device and which indicates a destination corresponding to the switch which is turned on.

When it is described that the movable body 102 "transmits" and "receives" signals, data, information and the like in the following explanation, this means that the movable body control device 108 of the movable body 102 transmits and receives the signals, data, information and the like. Further, unless otherwise noted, when the movable body 102 (that is, the movable body control device 108 of the movable body 102) transmits signals, data, information and the like to the server 110, the movable body 102 is assumed to transmit the signals, data, information and the like attached with the identification ID of the own device, and the server 110 is assumed to determine, based on the attached identification ID, the movable body 102 which is a transmission source of the received signals, data, information and the like.

Further, unless otherwise noted, in the following explanation, when the server 110 transmits signals, data, information and the like to the specific movable body 102, the server 110 is assumed to transmit the signals, data, information and the like attached with the identification ID of the specific movable body 102 which is a transmission destination, and the movable body 102 which receives the signals, data, information and the like is assumed to recognize that the received signals, data, information and the like are transmitted to the own device and processes the signals, data, information and the like when the identification ID attached to the signals, data, information and the like coincides with the identification ID of the own device.

The image acquisition unit 330 acquires a captured image of a surrounding region in front of the movable body 102 from the stereo camera 208 at predetermined time intervals, and transmits surrounding region image information including the acquired captured image to the server 110.

The drive control unit 340 controls the left drive motor 204 and the right drive motor 206 via the motor drive device 306 (described later) in accordance with the target speed and the target steering angle which are transmitted from the server 110, and causes the movable body 102 to travel. Further, when the drive control unit 340 receives a stop instruction from the server 110, the drive control unit 340 stops rotation of the left drive motor 204 and the right drive motor 206 via the motor drive device 306 and stops traveling of the movable body 102.

The odometry information acquisition unit 350 receives rotation signal pulses from the left drive motor 204 and the right drive motor 206 respectively, and transmits to the server 110 at predetermined time intervals as odometry information a travel distance of the left drive wheel 200 and a travel distance of the right drive wheel 202 which are converted from numbers of occurrences of the rotation signal pulses of the respective motors.

The motor drive device 306 controls supplies of electrical power to the left drive motor 204 and the right drive motor 206 in accordance with an instruction from the drive control unit 340, and causes the movable body 102 to travel or stop.

Figure 4:
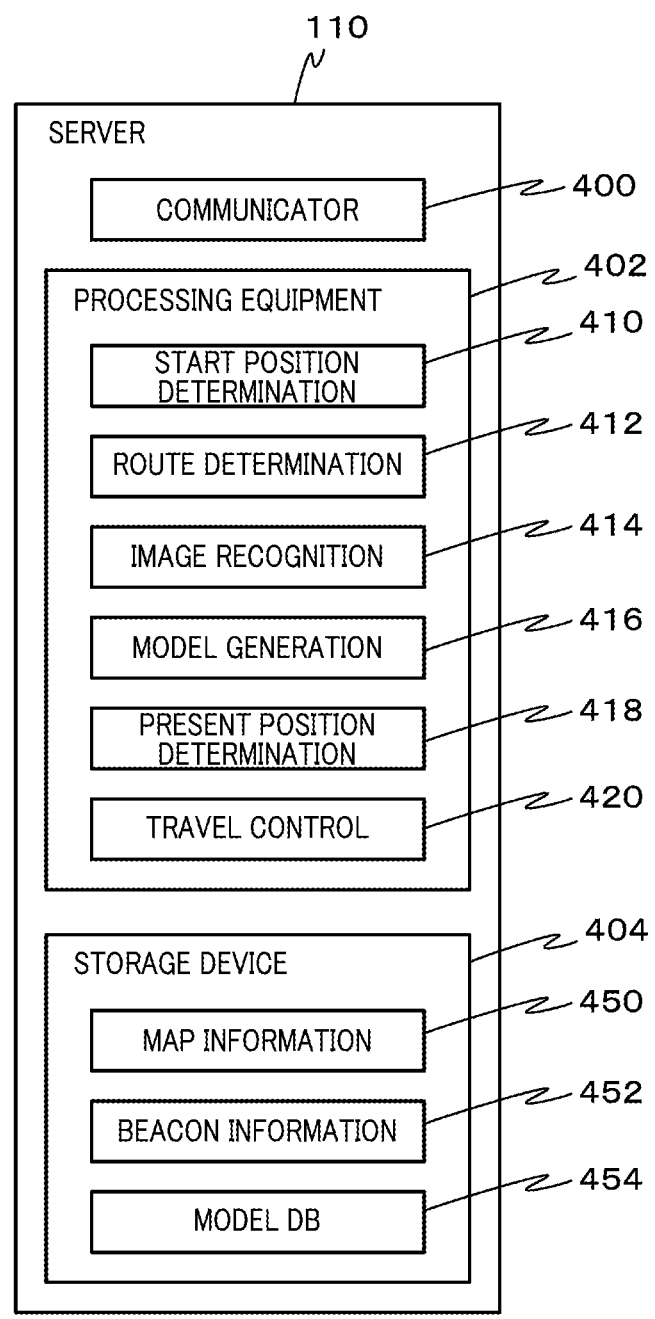
FIG. 4 is a diagram illustrating a configuration of a server configuring the movable body control system illustrated in FIG. 1.

FIG. 4 is a diagram illustrating a configuration of the server 110. The server 110 includes a communicator 400 for directly or indirectly communicating with the movable body control devices 108 of the respective movable bodies 102, processing equipment 402, and a storage device 404. The communicator 400 can be, for example, a wireless communicator that directly communicates with the movable body control device 108, or a communicator that is for indirectly communicating with the movable body control device 108 via another wireless communication device (not illustrated) that directly communicates with the movable body control device 108, and performs wireless communication or wired communication with the other wireless communication device The storage device 404 is configured by a hard disk device, a reading device for a computer-readable storage medium such as a DVD, and a CD ROM, and the like, and map information 450 and beacon information 452 are stored in the storage device 404 in advance.

The map information 450 includes information on a route and a shape of the traveling road of the movable body 102, and three-dimensional shapes of surrounding configuration of the ground including the traveling road, buildings and the like. Further, the traveling road of the movable body 102 is stored in advance by being divided into a plurality of areas based on predetermined references. The above described predetermined references can be references for classifying three-dimensional shape features in corresponding areas, such as presence or absence of walls and obstacles like "a straight road area without a wall on sides of the road", "a straight road area with a wall on a right side of the road", "a straight road area with a wall at a left side of the road", "a corner road area with a wall", "a corner road area without a wall", "a crossroad with a wall", "a crossroad without a wall" and the like.

Each area is stored in the map information 450 with an area identification ID peculiar to each area, associated with a class expressing any one of the above described three-dimensional shape features corresponding to each area (for example, a reference sign or the like expressing "the straight road area without a wall on sides of the road", "the straight road area with a wall on the right side of the road" or the like defined in advance, for example). Division into these areas may be executed by the processing equipment 402 of the server 110 in advance based on the information on the three-dimensional configuration of the ground (including the shape information of artificial matters such as buildings) obtained from the map information 450, and can be stored as a part of the map information 450.

In the beacon information 452, transmission frequencies and the installation position coordinates (latitudes/longitudes, for example) of the respective beacon transmitters 106 are stored.

Further, in the storage device 404, a model generated by a model generation unit 416 that will be described later is stored as a model database (model DB (Databases)) 454.

The processing equipment 402 is a computer having a processor such as a CPU (Central Processing Unit), a ROM (Read Only Memory) in which a program is written, a RAM (Random Access Memory) for temporarily storing data and the like, and has a start position determination unit 410, a route determination unit 412, an image recognition unit 414, the model generation unit 416, a present position determination unit 418, and a travel control unit 420.

The above described respective units included by the processing equipment 402 are realized by the processing equipment 402 which is a computer, executing programs, and the computer programs can be stored in an arbitrary storage medium which is readable by a computer. Instead of this, or in addition to this, all or some of the above described respective units also may be each configured by hardware including one or more electronic circuit components.

When the start position determination unit 410 receives a learning start request signal or a travel control start request signal from the movable body 102, the start position determination unit 410 determines in which position of a plurality of predetermined guidance start positions the movable body 102 is present, based on beacon reception information which is received from the movable body 102 subsequently to these signals.

The route determination unit 412 determines a destination of the movable body 102 based on the destination information received from the movable body 102, refers to the map information 450 stored in the storage device 404, and determines a target travel route from the guidance start position determined by the start position determination unit 410 to the above described destination.

The image recognition unit 414 performs image recognition processing on an image included in the surrounding image information received from the movable body 102, and performs obstacle detection for a front in a traveling direction of the movable body 102, and obstacle detection to side ways in front (i.e., the obstacle detection diagonally to the front) of the movable body 102. Here, the front in the traveling direction of the movable body 102 refers to a visual field range (a forward visual field range) having predetermined angles at a left and a right with a direction of a sight line of the stereo camera 208 as a center, for example, and side ways in front in the traveling direction refer to a left and a right visual field ranges (sideward visual field ranges) outside the forward visual field range. Further, an execution frequency of obstacle detection refers to a number of execution times per unit time, for example.

The image recognition unit 414 extracts characteristic matters (for example, utility poles, buildings and the like) in a surrounding in front of the movable body 102.

When the model generation unit 416 receives a learning start request signal from the movable body 102, the model generation unit 416 executes model learning processing (described later) to generate from time-series measurement values of the reception intensity of the beacon radio waves acquired by the movable body 102 at the time of traveling of the movable body 102 a model for determining an area in the traveling road on which the movable body 102 is traveling, based on the beacon reception information received from the movable body 102, and stores the model in the model DB 454 of the storage device 404.

More specifically, in the learning mode operation which will be described later, while the user causes the movable body 102 to travel, the model generation unit 416 receives the beacon reception information, the surrounding image information, and the odometry information from the movable body 102 at predetermined time intervals, and stores data of the time-series measurement values of the radio wave reception intensities of the respective beacon radio waves received by the movable body 102 while determining the area in which the movable body 102 is traveling from these kinds of information and the map information 450.

Subsequently, the model generation unit 416 generates a model for determining the area in which the movable body 102 is traveling at that time by machine learning, for example, from the time-series data of the above described radio wave reception intensity, for each determined area. In more detail, the model generation unit 416 determines a characteristic distribution in each area from a state of change in the time-series measurement value of the radio wave reception intensity of each of the beacon radio waves at the time of traveling in the area (in more detail, a state of distribution (hereinafter, also referred to as "a time-radio wave reception intensity distribution") of the time-series measurement values of radio wave reception intensity of each of beacon radio waves in two-dimensional coordinates configured by a time axis and a reception intensity axis) for each determined area, and the characteristic distribution is set as a model for determining the area.

Determination of the above described characteristic distribution in each of the areas like this can be obtained from maximum likelihood estimation of a Gaussian mixture distribution about, for example, the time-radio wave reception intensity distribution. Further, the maximum likelihood estimation can be performed by using expectation maximization (EM) algorithm, for example.

Figure 5:
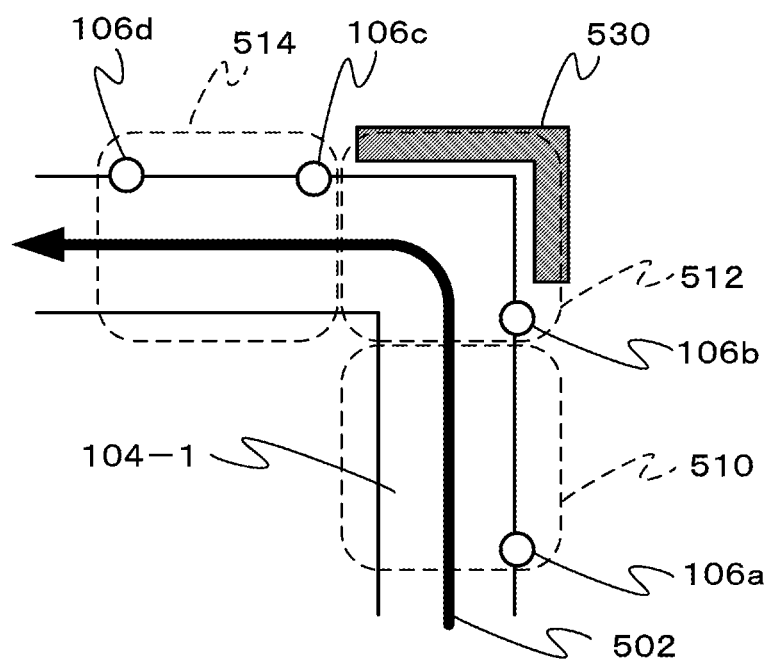
FIG. 5 is a view illustrating an example of a traveling road of the movable body that is used at a time of model learning, in the present movable body control system.

FIG. 5 is a view that illustrates an example of the traveling road of the movable body 102, which is used at a time of model learning. In the illustrated example, a travel route 502 of the movable body 102 is illustrated by a thick arrow on a traveling road 104-1. The traveling road 104-1 is divided into areas 510 and 514 of "the straight road without a wall on both sides", and an area 512 of "a corner road with a wall ahead". Further, along the traveling direction of the travel route 502 illustrated by the thick arrow, beacon transmitters 106a, 106b, 106c and 106d are installed in boundary portions of the traveling road at a right side in the traveling direction.

Figure 6:
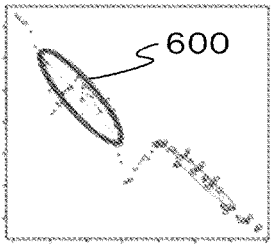
FIG. 6 illustrates an example of a distribution of time-series measurement values of beacon radio wave reception intensity that is measured at a time of traveling on the traveling road illustrated in FIG. 5.

FIG. 6 is an example of a time-series measurement value of the beacon radio wave reception intensity measured at the time of traveling on the travel route 502 illustrated in FIG. 5. In each of 3×4 graphs illustrated in FIG. 6, a vertical axis represents a radio wave reception intensity, and a horizontal axis represents a time. Further, out of the 3×4 graphs illustrated in FIG. 6, three graphs in a first row show distributions of the time-series measurement values of the reception intensity of the beacon radio waves from the beacon transmitter 106a placed on the travel route 502, and show the distributions in the areas 510, 512 and 514 in sequence from the left. Likewise, the graphs in second, third and fourth rows are respectively distributions of time-series measurement values of the radio wave reception intensities from the beacon transmitters 106b, 106c and 106d, and show distributions in the areas 510, 512 and 514 in sequence from the left.

Ellipses 600, 602, 604 and 606 illustrated in the graphs in FIG. 6 respectively show Gaussian distributions (determined by mean values and variances) determined as characteristic distributions (that is, models) to the areas 510, 512 and 514. The Gaussian distributions determined in this way can function as more robust models by being updated by being combined with results of analysis of a plurality of Gaussian mixture distributions obtained each time the movable body 102 travels in the same area.

In the example of FIG. 6, in the case of the areas 510 and 514 of "the straight road without a wall on both sides", the data distributions (the distributions of parts encircled by the ellipses 600 and 606 which are illustrated) in which the reception intensities reduce linearly with respect to time, which are characteristic at the time of being away from the beacon transmitters 106a and 106d are respectively generated as models.

Further, in the example of FIG. 6, in the area 512 of "the corner road with a wall ahead", the radio waves from the beacon transmitters 106b and 160c are reflected by the wall 530 and interfere with each other, and/or noise radio waves from the left drive motor 204 and the right drive motor 206 of the movable body 102 are reflected by the wall 530 to interfere with the beacon radio waves of the beacon transmitters 106b and 160c, whereby the distributions of the time-series measurement values of the radio wave reception intensities shows slightly complicated forms. However, by executing Gaussian mixture distribution analysis to the distributions, the characteristic distributions in the time-series measurement values of the reception intensity (distributions of the portions respectively encircled by the ellipses 602 and 604) are captured with respect to the beacon radio waves of the beacon transmitters 106b and 106c. The distributions are distributions peculiar to the area 512, which are obtained as a result of radio wave interference and the like that occur due to the presence of the wall 530, and can be used as the models for determining the area 512.

That is, the models which are created from the time-series data of the beacon radio wave reception intensities as described above are such that focus on the temporal change of the reception intensities of beacon radio waves, and therefore, are models with versatility without depending on variations in the reception sensitivity of the beacon radio waves among the movable bodies 102 (more specifically, among the respective beacon receivers 300 of the movable body control devices 108 of the respective movable bodies 102). Consequently, by using the models created with use of the specific movable body 102 commonly in a plurality of arbitrary movable bodies 102, travel of these movable bodies 102 can be autonomously controlled.

Further, the temporal change of the radio wave reception intensity of each of the beacon radio waves appear as a result of the three-dimensional shape features such as presence of the wall in the area in which the movable body 102 is traveling at present (that is, the result of radio wave interference and the like due to the shape features like this), so that the model which is generated as described above includes influences of the three-dimensional shape features in the area.

Further, by determining the area by using these models, entry into the area and approach to an obstacle such as a wall can be detected earlier as compared with the prior art that performs position determination based on whether or not the reception intensity of beacon radio waves is equal to or larger than a threshold value, so that the movable body 102 can be controlled to travel smoothly by performing deceleration and the like earlier.

In the present embodiment, the model generation unit 416 calculates, for example, a median value and a covariance value of a Gaussian mixture function expressing the distribution determined as described above as parameters expressing a model. The model (that is, the calculated median value and covariance value) is stored in the model DB 454, associated with the area in which the model is obtained and the class expressing the shape features of the area.

Returning to FIG. 4, the present position determination unit 418 determines the area (present area) in which the movable body 102 is traveling at present and the present position of the movable body 102 by the beacon reception information and the like received from the movable body 102 and the model stored in the model DB 454, in travel control processing (described later) that is executed in the server 110 at the time of receiving the travel control start request signal from the movable body 102.

The travel control unit 420 determines the target speed and the target steering angle which should be set to the movable body 102 to cause the movable body 102 to travel along a target travel route determined by the route determination unit 412, based on the above described present area and present position determined by the present position determination unit 418, the map information 450 and the like in the travel control processing (described later), and transmits the target speed and the target steering angle to the movable body 102.

Next, an operation of the movable body control system 100 will be described.

The movable body control system 100 operates in two operation modes that are the learning mode operation of generating a model, and the working mode operation of controlling travel of the movable body 102 by using the generated model. The learning mode operation and the working mode operation are started by the movable body 102 transmitting a learning start request signal or a travel control start request signal to the server 110 by a user of the movable body 102 turning on the learning switch 212 or the travel switch 214 of the input device 210. Further, when a power supply is turned on, the server 110 waits for reception of the learning start request signal or the travel control start request signal from at least one movable body 102, and when the server 110 receives the learning start request signal, the server 110 starts a process of the learning mode operation, and when receiving the travel control start request signal, the server 110 starts a process of the working mode operation.

Hereinafter, the learning mode operation and the working mode operation will be described in sequence.

<<Learning Mode Operation>>

First, the learning mode operation will be described. The learning mode operation is started by the user disposing the movable body 102 in any one of the predetermined guidance start positions, and turning on the learning switch 212 of the input device 210 in the guidance start position. By the turning-on operation to the learning switch 212, the movable body control device 108 of the movable body 102 starts execution of learning data transmission processing. In the learning data transmission processing, the movable body control device 108 firstly transmits a learning start request signal to the server 110, and subsequently starts to transmit to the server 110 beacon reception information, surrounding image information and odometry information. The user causes the movable body 102 to travel along s desired route, and during the travel, the movable body control device 108 of the movable body 102 continuously transmits the beacon reception information, the surrounding image information, and the odometry information to the server 110 at predetermined time intervals. The above described travel of the movable body 102 by the user in the learning mode operation can be performed by the user who is an occupant in the movable body 102 which is an electric wheelchair, giving an instruction of traveling forward, turning to the left, turning to the right or the like to the drive control unit 340 via a joystick (not illustrated) that is connected to the drive control unit 340 by using a known technique in the field of an electric wheelchair, for example. Alternatively, the user who is not an occupant of the movable body 102 can cause the movable body 102 to travel as the user who is not the occupant pushes the movable body 102 with hands.

The server 110 executes the model learning processing in response to reception of the learning start request signal from the movable body control device 108 of the movable body 102. In the model learning processing, the server 110 receives the beacon reception information, the surrounding image information, and the odometry information at predetermined time intervals from the movable body 102 while the user causes the movable body 102 to travel. Subsequently, while the server 110 determines the area in which the movable body 102 is traveling at present based on the beacon reception information, the surrounding image information and the odometry information which are received from the movable body 102, and the map information 450 stored by the storage device 404, the server 110 stores in the storage device 404 as learning data the beacon reception information which is received at the predetermined time intervals from the movable body 102, associated with the determined area.

When the user ends travel of the movable body 102 and turns off the learning switch 212 of the input device 210, the movable body control device 108 of the movable body 102 transmits a learning end request signal to the server 110, ends transmission of the beacon reception information, the surrounding image information, and the odometry information, and ends the learning data transmission processing. The server 110 which receives the learning end request signal refers to the learning data stored in the storage device 404, and for each determined area described above, calculates a distribution (a time-radio wave reception intensity distribution) of the time-series measurement values of the beacon radio wave reception intensity from the beacon reception information which is associated with the area to determine the characteristic distribution of the area from the distribution by machine learning, for example. Subsequently, the server 110 stores the parameter of the characteristic distribution which is determined in the model DB 454 of the storage device 404 as a model for determining the area from the time-series data of the beacon radio wave reception intensity, and ends the model learning processing.

Hereinafter, learning data transmission processing that is executed by the movable body control device 108 of the movable body 102 at the time of the learning mode operation, and model learning processing that is executed by the server 110 at the time of the learning mode operation will be described in sequence.

<Learning Data Transmission Processing>

Figure 7:
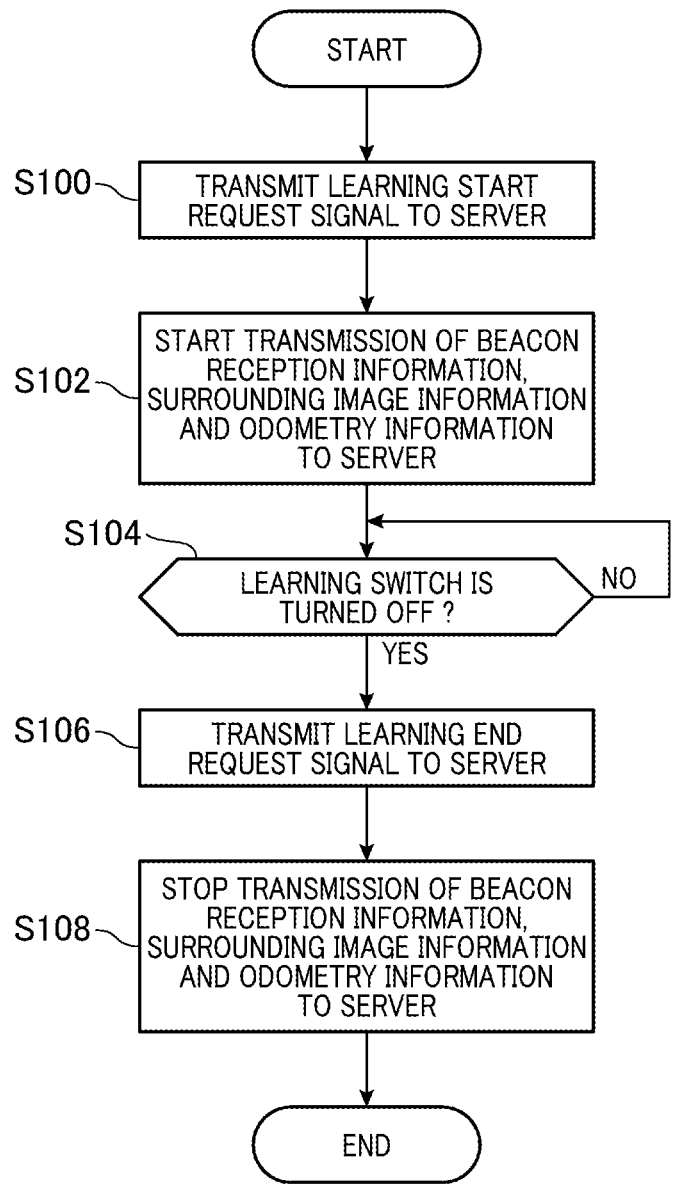
FIG. 7 is a flowchart illustrating a process of learning data transmission processing that is executed in a learning mode operation by the movable body in the present movable body control system.

First, a process of the learning data transmission processing that is executed by the movable body control device 108 of the movable body 102 will be described in accordance with a flowchart illustrated in FIG. 7. This processing is started by the user disposing the movable body 120 in any one of the predetermined guidance start positions and by the user turning on the learning switch 212 of the input device 210 in the guidance start position.

When the processing is started, the processing equipment 304 of the movable body control device 108 transmits a learning start request signal attached with the identification ID of the own device to the server 110 via the communicator 302 (S100). Further, the processing equipment 304 starts transmission of the beacon reception information, the surrounding image information and the odometry information to the server 110 (S102). Specifically, the movable body control device 108 receives beacon radio waves from the respective beacon transmitters 106 which are present around the movable body 102 via the beacon receiver 300 at predetermined time intervals, by the beacon measurement unit 310, and transmits to the server 110 as the beacon reception information the reception intensity for each of the beacon radio waves (i.e., for each radio wave having different frequency) associated with the frequency of the beacon radio wave and the time at which the reception intensity is measured.

Further, the movable body control device 108 acquires with the image acquisition unit 330 an image captured by the stereo camera 208 at predetermined time intervals, associates the image with a time of the acquisition, and transmits the image to the server 110 as the surrounding image information. Further, the movable body control device 108 calculates respective travel distances of the left drive wheel 200 and the right drive wheel 202 from the numbers of rotation pulses received from the respective left drive motor 204 and right drive motor during a predetermined time interval at the predetermined time intervals, by the odometry information acquisition unit 350, associates the travel distances with the calculated time, and transmits the respective distances to the server 110 as the odometry information.

Next, the processing equipment 304 determines whether or not the learning switch 212 of the input device 210 is turned off (S104). When the learning switch 212 is not turned off (S104, No), the processing equipment 304 returns to step S104 and waits for the learning switch 212 to be turned off. During this while, transmission of the beacon reception information, the surrounding image information and the odometry information to the server 110 is continued.

When the learning switch 212 of the input device 210 is turned off (S104, Yes), the processing equipment 304 transmits the learning end request signal to the server 110 (S106), stops transmission of the beacon reception information, the surrounding image information, and the odometry information to the server 110 (S108), and thereafter, ends the processing.

[Model Learning Processing]

Figure 8:
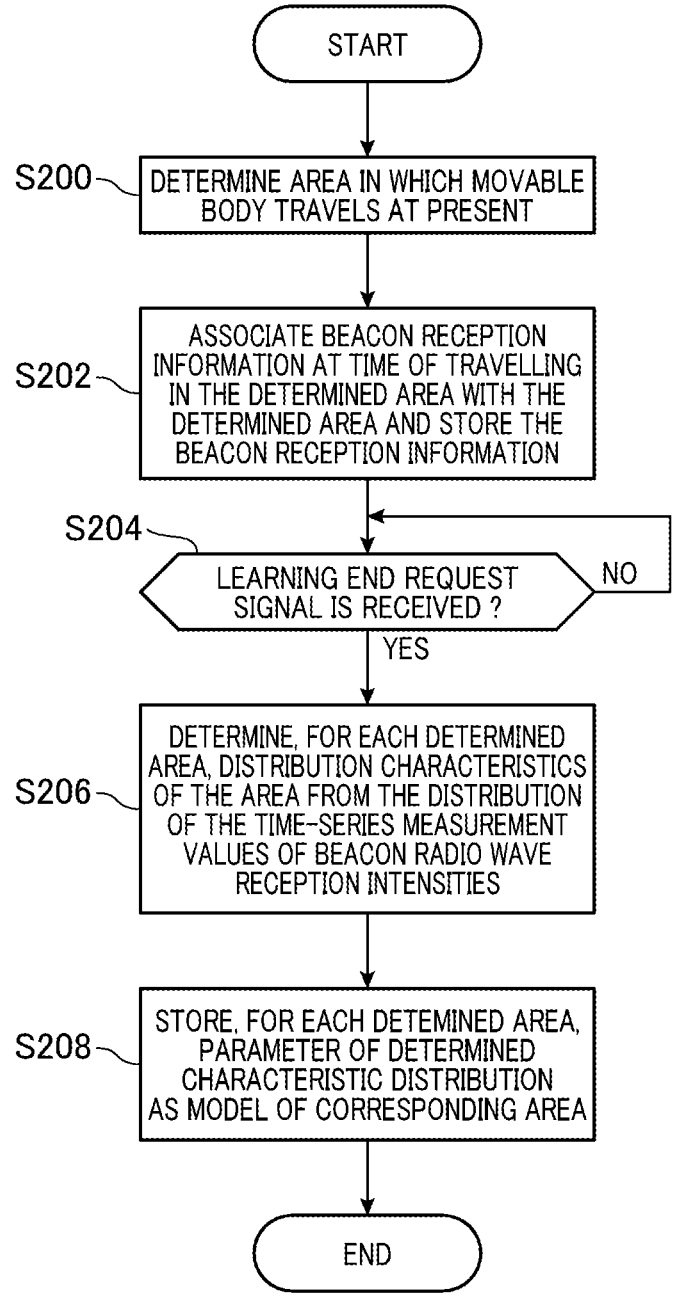
FIG. 8 is a flowchart illustrating a process of model learning processing that is executed in the learning mode operation by a server in the present movable body control system.

Next, the process of the model learning processing which is performed by the server 110 will be described in accordance with a flowchart illustrated in FIG. 8. This processing is started when the server 110 receives a learning start request signal from the movable body 102, and this processing is executed with respect to the movable body 102 as a target which is identified based on the identification ID attached to the learning start request signal. Further, in the case where the server 110 receives learning start request signals from a plurality of movable bodies 102, the model learning processing is individually executed in parallel or in sequence with respect to each of the plurality of movable bodies 102 as targets which are the transmission sources of the learning start request signals. However, in the following, in order to facilitate understanding by avoiding redundant description, model learning processing for the single movable body 102 will be described.

After the processing equipment 402 of the server 110 receives a learning start request signal from the movable body 102, the processing equipment 402 continuously receives the beacon reception information, the surrounding image information and the odometry information respectively at predetermined time intervals from the movable body 102 in parallel with execution of the model learning processing described below, and uses the beacon reception information, the surrounding image information and the odometry information to execute the model learning processing. Further, the processing equipment 402 performs with the image recognition unit 414 image recognition processing on the surrounding image information received from the movable body 102 in parallel with the model learning processing, recognizes obstacles such as a wall which is captured in the surrounding image and extracts characteristic matters, and uses the characteristic matters in the execution of the model learning processing.

When the model learning processing is started, the model generation unit 416 of the server 110 determines an area in which the movable body 102 is traveling at present based on the beacon reception information, the surrounding image information, and the odometry information that are received from the movable body 102 and the map information 450 stored by the storage device 404 (S200), and stores in the storage device 404 as learning data the beacon reception information received from the movable body 102 at the time of traveling in the determined area at predetermined time intervals, associated with the determined area (S202). As described above, information on respective areas into which the traveling road of the movable body 102 is divided is assumed to be stored in the map information 450 in advance.

Next, the model generation unit 416 determines whether or not the model generation unit 416 receives a learning end request signal from the movable body 102 (S204). When the model generation unit 416 does not receive the learning end request signal (S204, No), the model generation unit 416 returns to step S200 and repeats the processing. When the model generation unit 416 receives the learning end request signal (S204, Yes), the model generation unit 416 determines, for each determined area, distribution characteristics of the area from the distributions of the time-series measurement values of the beacon radio wave reception intensity (S206), stores a parameter of the determined characteristic distribution in the model DB 454 of the storage device 404 as a model of the corresponding area (S208), and ends the processing.

Note that in the present embodiment, the user causes the movable body 102 to travel, and the server 110 creates a model based on the beacon reception information and the like which are acquired during the travel, but the present invention is not limited to this, and the server 110 may cause the movable body 102 to travel automatically, for example, in the nighttime when the movable body 102 is not used, and acquire the beacon reception information and the like during the automatic travel to create the model. The automatic travel can be performed, for example, by the server 110 searching for a travel route including an area for which a model is not generated, transmitting the target speed and the target steering angle to the movable body 102 at predetermined time intervals based on the surrounding image information received from the movable body 102, the map information 450 and the like, and thereby causing the movable body 102 to travel along the above described travel route which is searched for.

<<Working Mode Operation>>

Next, the working mode operation will be described. The working mode operation is started by the user disposing the movable body 102 in any one of the predetermined guidance start positions, and turning on the travel switch 214 of the input device 210 in the guidance start position. By the turning-on operation to the travel switch 214, the movable body control device 108 of the movable body 102 starts execution of travel data transmission processing and travel processing. In the travel data transmission processing, the movable body control device 108 firstly transmits, to server 110, the travel control start request signal attached with the identification ID of the own device, and starts transmission of the beacon reception information, the surrounding image information and the odometry information to the server 110.

In the travel processing, the movable body control device 108 receives a target speed and a target steering angle from the server 110 while keeping the present speed and steering angle (the speed is zero at the time of start of the travel processing), and every time the movable body control device 108 has received the target speed and the target steering angle from the server 110, the movable body control device 108 controls rotations of the left drive motor 204 and the right drive motor 206 to causes the movable body 102 to travel so as to realize the target speed and the target steering angle. When the movable body control device 108 receives a stop instruction from the server 110, the movable body control device 108 stops the movable body 102 by controlling the rotations of the left drive motor 204 and the right drive motor 206.

The server 110 starts travel control processing in response to reception of the travel control start request signal from the movable body 102. In the travel control processing, the server 110 determines the guidance start position at which the movable body 102 is placed at present and a destination, based on the beacon reception information and the destination information which are received from the movable body 102, and determines a target travel route from the guidance start position to the destination. The server 110 calculates a distribution of the time-series measurement values of the beacon radio wave reception intensity from the beacon reception information which is received from the movable body 102 at predetermined time intervals, refers to the models stored in the model DB 454, determines the area (present area) in which the movable body 102 is traveling at present and determines a present position of the movable body 102.

Further, the server 110 calculates the target speed and the target steering angle for causing the movable body 102 to travel along the above described determined target travel route based on the above described present area and present position which are determined, the map information 450 and the like, and transmits the target speed and the target steering angle to the movable body 102.

Further, when the server 110 determines an area including the destination as the present area, the server 110 transmits a stop instruction to the movable body 102.

Hereinafter, the travel data transmission processing and the travel processing which are executed by the movable body control device 108 of the movable body 102 at the time of the working mode operation, and the travel control processing which is executed by the server 110 at the time of the working mode operation will be described in sequence.

<Travel Data Transmission Processing>

Figure 9:
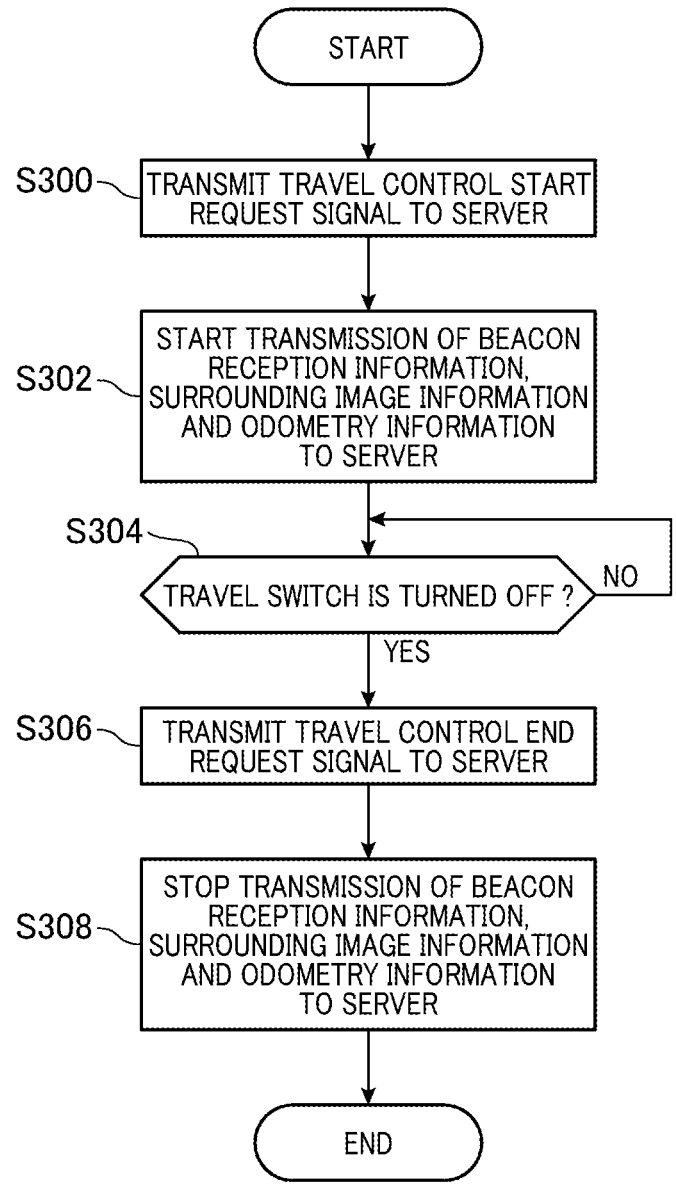
FIG. 9 is a flowchart illustrating a process of traveling data transmission processing that is executed in a working mode operation by the movable body in the present movable body control system.

First, the travel data transmission processing which is executed by the movable body control device 108 of the movable body 102 will be described in accordance with a flowchart illustrated in FIG. 9. This processing is started with the travel processing which will be described later, in response to the user disposing the movable body 102 in any one of the predetermined guidance start positions, and turning on the travel switch 214 of the input device 210 in the guidance start position.

When the travel data transmission processing is started, the processing equipment 304 of the movable body control device 108 transmits, to the server 110 via the communicator 302, the travel control start request signal attached with the identification ID of the own device (S300). Further, the processing equipment 304 starts transmission of the beacon reception information, the surrounding image information and the odometry information to the server 110 (S302). Transmission of these kinds of information is specifically similar to the processing in step S102 in FIG. 7.

Next, the processing equipment 304 determines whether or not the travel switch 214 of the input device 210 is turned off (S304). When the travel switch 214 is not turned off (S304, No), the processing equipment 304 returns to step S304 and waits for the travel switch 214 to be turned off. During this while, transmission of the beacon reception information, the surrounding image information and the odometry information to the server 110 is continued. When the travel switch 214 is turned off (S304, Yes), the processing equipment 304 transmits a travel control end request signal to the server 110 (S306), stops transmission of the beacon reception information, the surrounding image information and the odometry information to the server 110 (S308), and thereafter, ends the present processing.

<Travel Processing>

Figure 10:
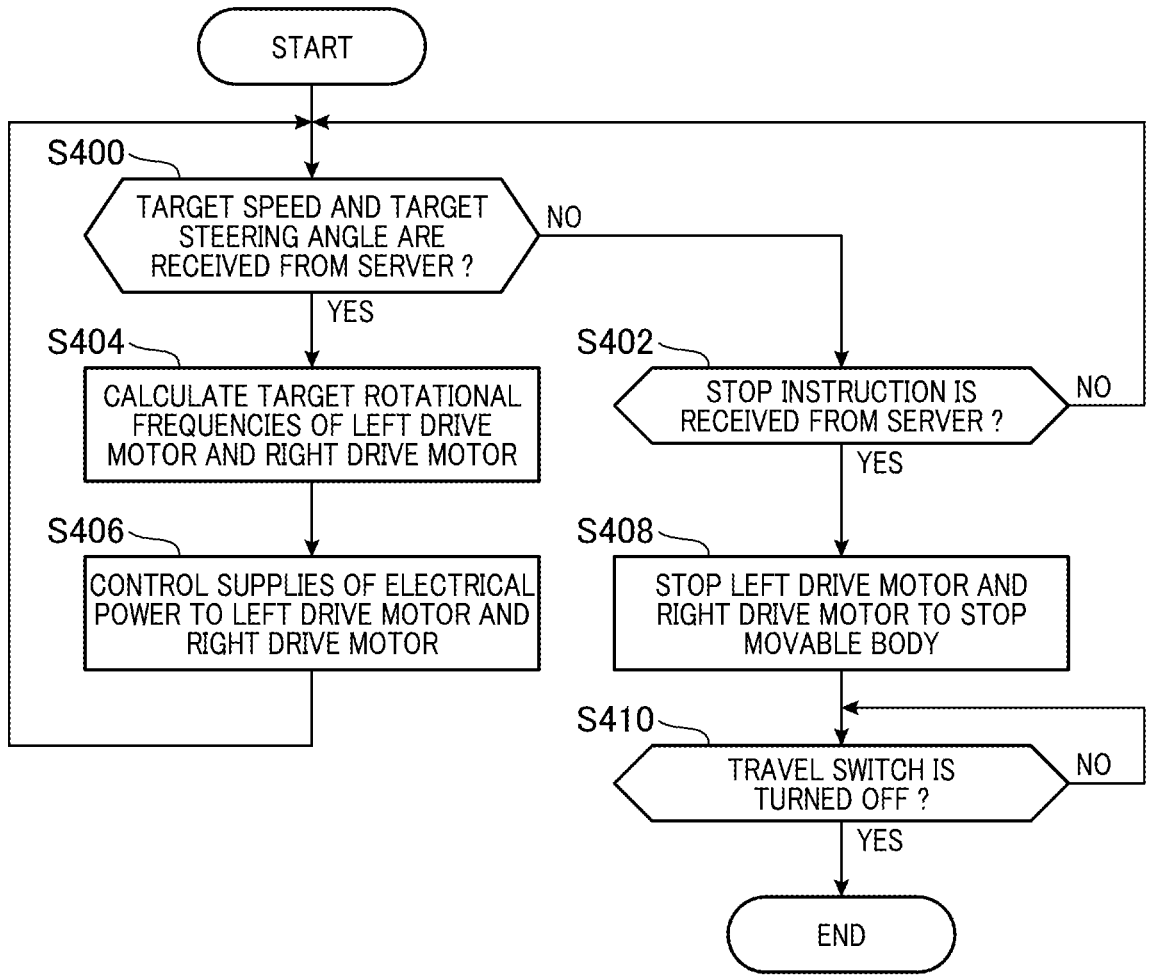
FIG. 10 is a flowchart illustrating a process of traveling processing that is executed in the working mode operation by the movable body in the present movable body control system.

Next, the travel processing executed by the movable body control device 108 of the movable body 102 will be described in accordance with a flowchart illustrated in FIG. 10. This processing is started with the aforementioned travel data transmission processing in response to the user disposing the movable body 102 in any one of the predetermined guidance start position, and turning on the travel switch 214 of the input device 210 in the guidance start position.

When the travel processing is started, the drive control unit 340 of the processing equipment 304 firstly determines whether or not the target speed and the target steering angle are received from the server 110 while keeping the present speed and the present steering angle (the speed is zero at a time point of start of the travel processing) (S400), and then, when the target speed and the target steering angle are not received (S400, No), the drive control unit 340 determines whether or not a stop instruction is received from the server 110 (S402). When a stop instruction is not received (S402, No), the drive control unit 340 returns to step S400, and waits for reception of the target speed, the target steering angle and the strop instruction.

When the drive control unit 340 receives the target speed and the target steering angle from the server 110 (S400, Yes), the drive control unit 340 calculates target rotational frequencies which should be set to the left drive motor 204 and the right drive motor 206 to realize the received target speed and target steering angle respectively and outputs the target rotational frequencies to the motor drive device 306 (S404). On the basis of the target rotational frequencies for the left drive motor 204 and the right drive motor which are outputted by the drive control unit 340, the motor drive device 306 controls supplies of electrical power to the left drive motor 204 and the right drive motor so that the respective rotational frequencies of the left drive motor 204 and the right drive motor match the respective target rotational frequencies (S406).

Subsequently, the drive control unit 340 returns to step S400, and waits for reception of a new target speed and target steering angle or a stop instruction from the server 110, while keeping the present speed and the present steering angle (that is, while causing the motor drive device 306 to keep the present rotational frequencies of the left drive motor 204 and the right drive motor 206).

When the drive control unit 340 receives a stop signal from the server 110 in step S402 (S402, Yes), the drive control unit 340 instructs the motor drive device 306 to reduce the rotational frequencies of the left drive motor 204 and the right drive motor 206 to zero, and stops the movable body 102 (S408). Subsequently, the drive control unit 340 determines whether or not the travel switch 214 of the input device 210 is turned off (S410). When the travel switch 214 is turned off (S410, Yes), the drive control unit 340 ends the travel processing. When the travel switch 214 is not turned off (S410, No), the drive control unit 340 returns to step S410 and waits for the travel switch 214 to be turned off.

In the aforementioned travel processing, after the movable body 102 is stopped, the travel switch 214 is turned off, and thereby the travel processing is ended. Alternatively or additionally, irrespective of whether or not the stop instruction is received, the travel processing can be ended by stopping traveling of the movable body 102 when the travel switch 214 is turned off, even while the movable body 102 is traveling. In this case, the drive control unit 340 can stop the movable body 102 by giving an instruction to the motor drive device 306 to decrease the rotational frequencies of the left drive motor 204 and the right drive motor 206 at a predetermined deceleration.

[Travel Control Processing]

Next, a process of the travel control processing which is performed by the server 110 will be described in accordance with a flowchart illustrated in FIG. 11.

This travel control processing is started in response to the processing equipment 402 receiving a travel control start request signal or travel control start request signals from one or a plurality of movable bodies 102, and is executed in parallel and individually with respect to the one or the plurality of movable bodies 102 which transmits or transmit the travel control start request signal or the travel control start request signals. However, hereunder, in order to avoid redundant statements and facilitate understanding, the travel control processing for the single movable body 102 will be described.

After the processing equipment 402 of the server 110 receives the travel control start request signal from the movable body 102, the processing equipment 402 receives, in parallel with the travel control processing described below, the beacon reception information, the surrounding image information and the odometry information from the movable body 102 continuously at predetermined time intervals respectively, and uses these received pieces of information to execute the travel control processing. Further, the processing equipment 402 performs, in parallel with the travel control processing, image recognition processing by means of the image recognition unit 414 on the surrounding image information received from the movable body 102 to recognize an obstacle such as a wall that is captured in the surrounding image and to extract a characteristic matter, and uses the characteristic matter in execution of the travel control processing.

When the processing equipment 402 starts execution of the travel control processing, the processing equipment 402 firstly receives the beacon reception information from the movable body 102 which is a control target, and determines the guidance start position which is the present position of the movable body 102 by means of the start position determination unit 410 (S500). More specifically, the start position determination unit 410 determines a frequency of a beacon radio wave having the highest reception intensity out of the beacon radio waves that are received by the movable body 102, based on the beacon reception information that is transmitted from the movable body 102 subsequently to the travel control start request signal. And then, the start position determination unit 410 refers to the beacon information 452 stored in the storage device 404, determines a position of the beacon transmitter 106 having the determined frequency, and determines the predetermined guidance start position which is the nearest to the position of the determined beacon transmitter 106, as the present position of the movable body 102.

Next, the processing equipment 402 receives the destination information from the movable body 102 and determines a destination (S502). Then, by means of the route determination unit 412, the processing equipment 402 refers to the map information 450 stored by the storage device 404 on the basis of the determined destination, and the guidance start position determined in step S500, and determines the target travel route to the destination from the guidance start position (S504).

Next, the travel control unit 420 of the processing equipment 402 calculates the target speed and the target steering angle for causing the movable body 102 to start travel along the target travel route, referring to the target travel route and the map information 450. Then, the travel control unit 420 transmits the target speed and the target steering angle which are calculated to the movable body 102, and starts travel of the movable body 102 along the target travel route (S506). A direction which a front face of the movable body 102 faces at the travel starting time point can be determined by comparing, for example, characteristic matters (a utility pole, a building and the like) around the guidance start position, which are extracted by the image recognition unit 414 from the surrounding image information received from the movable body 102, and the characteristic matters shown in the map information 450.

Next, the present position determination unit 418 of the processing equipment 402 calculates a distribution of the time-series measurement values of the beacon radio wave reception intensity (time-radio wave reception intensity distribution) from the beacon reception information received from the movable body 102 at predetermined time intervals (S508). Then, referring to the model stored in the model DB 454 of the storage device 404 on the basis of the calculated distribution of the measurement values, the present position determination unit 418 determines the area (the present area) in which the movable body 102 is traveling at present (S510), and determines the present position of the movable body 102 (S512). Here, determination of the present position of the movable body 102 can be performed based on the above described determined present area, the image recognition result in the image recognition unit 414 about the surrounding image information from the movable body 102, and/or the odometry information from the movable body 102.

Next, the travel control unit 420 determines whether or not the above described determined present area is an area including a destination (S514). When the determined present area is an area including the destination (S514, Yes), the travel control unit 420 transmits a stop instruction (a target speed set at zero, for example) to the movable body 102 (S516). Subsequently, the travel control unit 420 determines whether or not the travel control unit 420 receives the travel control end request signal from the movable body 102 (S518). When the travel control unit 420 does not receive the travel control end request signal (S518, No), the travel control unit 420 returns to step S518 and waits for reception of the travel control end request signal. When the travel control unit 420 receives the travel control end request signal (S518, Yes), the travel control unit 420 ends the processing.

When the above described determined present area is not an area including the destination in step S514 (S514, No), the travel control unit 420 executes travel instruction calculation processing (described later) of calculating the target steering angle and the target speed which should be transmitted to the movable body 102 (S520). Subsequently, the travel control unit 420 transmits the target steering angle and the target speed which are calculated to the movable body 102 (S522), and returns to step S508 to repeat the processing. In order to repeat the process in step S508 at predetermined time intervals Δt1 (for example, 100 ms), the processing equipment 402 adjusts a time period from the end of the process in step S522 to the restart of process in step S508 by using a timer (not illustrated) in the server 110, for example.

<Travel Instruction Calculation Processing>

Next, the travel instruction calculation processing in step S520 in FIG. 11 will be described in accordance with flowcharts in FIGS. 12 and 13.

Figure 12:
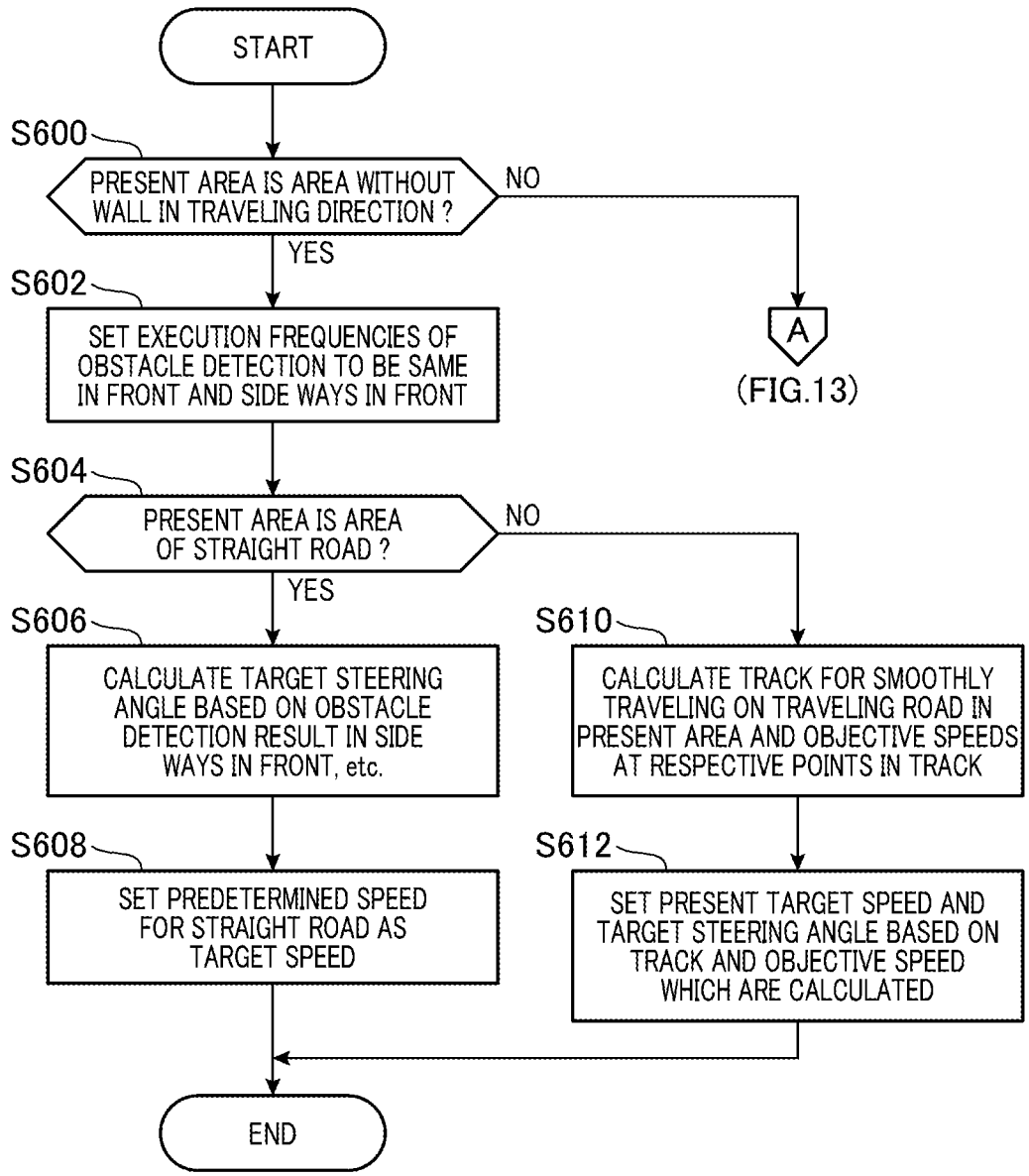
FIG. 12 is a flowchart illustrating a process of travel instruction calculation processing that is executed in the travel control processing illustrated in FIG. 11.

When the processing is started, the travel control unit 420 determines whether or not the present area is an area without a wall in the traveling direction, referring to the class of the present area stored in the map information 450 (S600 in FIG. 12). When the present area is the area without a wall in the traveling direction (S600, Yes), the travel control unit 420 instructs the image recognition unit 414 with respect to image recognition concerning the surrounding image information from the movable body 102 to set execution frequencies of obstacle detection to be same to a front and to side ways in front in the travelling direction of the movable body 102 (S602).

Next, referring to the class of the present area stored in the map information 450, the travel control unit 420 determines whether or not the present area is an area of a straight road (For example, a traveling road portion having a radius of curvature of a predetermined value or more. Hereinafter, the same will apply.) (S604). When the present area is an area of the straight road (S604, Yes), the travel control unit 420 calculates the steering angle which should be set to the movable body 102, based on the present position of the movable body 102, the shape of the target travel route, the shape features obtained from the class of the present area, the odometry information received from the movable body 102, and/or the result of the obstacle detection to side ways in front in the image recognition unit 414, sets the calculated steering angle as the target steering angle (S606), sets a predetermined speed for the straight road as the target speed (S608), and ends the processing.

When the present area is not the area of the straight road, that is, when the present area is the area of a corner road (a traveling road portion which bends) or a curve road (For example, a traveling road portion having a radius of curvature less than a predetermined value. The same applies hereinafter) (S604, No), on the basis of the present position of the movable body 102, the shape of the target travel route and/or the odometry information received from the movable body 102, the present speed, and the predetermined upper limit value of the acceleration/deceleration (and/or jerk) that is for smooth traveling, the travel control unit 420 calculates a track for smoothly traveling on the traveling road (that is, a corner road or a curve road) within the range not exceeding an upper limit value (S610). And then, the travel control unit 420 sets as the target steering angle and as the target speed a steering angle and a speed that should be set at present to travel along the calculated track (S612), and ends the processing.

Figure 13:
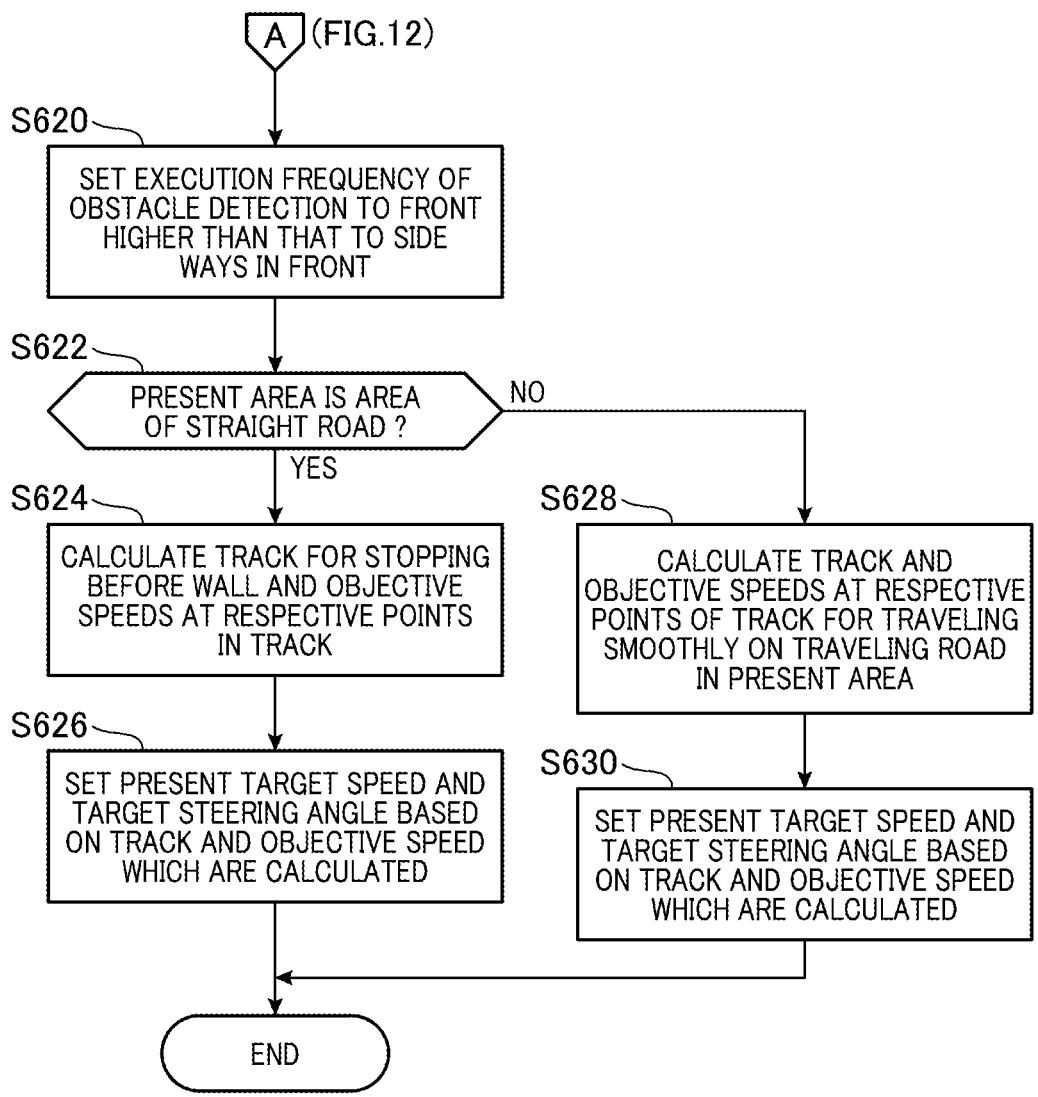
FIG. 13 is a flowchart illustrating a process of the travel instruction calculation processing that is executed in the travel control processing illustrated in FIG. 11.

When the present area is an area with a wall in the traveling direction in step S600 (S600, No), the travel control unit 420 instructs the image recognition unit 414 with respect to image recognition concerning the surrounding image information from the movable body 102 to increase (double, for example) the execution frequency of obstacle detection for the front in the traveling direction of the movable body 102 more than the execution frequency of the obstacle detection to the side ways in front (S620 in FIG. 13).

Subsequently, referring to the class of the present area which is stored in the map information 450, the travel control unit 420 determines whether or not the present area is the area of the straight road (S622). When the present area is the area of the straight road (S622, Yes), the travel control unit 420 determines that the present area is the area of a terminal road where the traveling road terminates in the area, and calculates a track for stopping smoothly before the wall in front and speeds which should be realized at respective points on the track within a range not exceeding the upper limit value, based on a distance to the wall in front, which is obtained from the image recognition result in the image recognition unit 414, the present speed, and a predetermined deceleration upper limit value set in advance for performing smooth stop (S624). Then, the travel control unit 420 sets, as the target steering angle and as the target speed, the calculated steering angle and the calculated speed which should be set at present to travel along the calculated track (S626), and ends the processing.

When the present area is not the area of the straight road, but is an area of a corner road or a curve road in step S622 (S622, No), the travel control unit 420 calculates a track for traveling smoothly on the traveling road in the present area and the speeds (objective speeds) which should be realized at the respective points on the track, within the range not exceeding upper limit values, based on the present position of the movable body 102, a distance to a wall in front which is obtained from the result of detection of the obstacle in front in the image recognition unit 414, the shape of the target travel route, and/or the odometry information received from the movable body 102, the present speed and predetermined upper limit values of the acceleration/deceleration (and/or a jerk) set in advance for performing smooth turn (S628). Then, the travel control unit 420 sets, as the target steering angle and as the target speed, the steering angle and the speed which should be set at present to travel along the calculated track (S630), and ends the processing.

By the above described processing, on the basis of the area features (for example, presence of a wall or the like) of the area on which the movable body 102 travels at present, the speed of the movable body 102 can be adjusted and/or a change rate (a deceleration or an acceleration) or the like of speed of the movable body 102 can be adjusted so that travel of the movable body 102 in the area becomes smooth.

Figure 14:
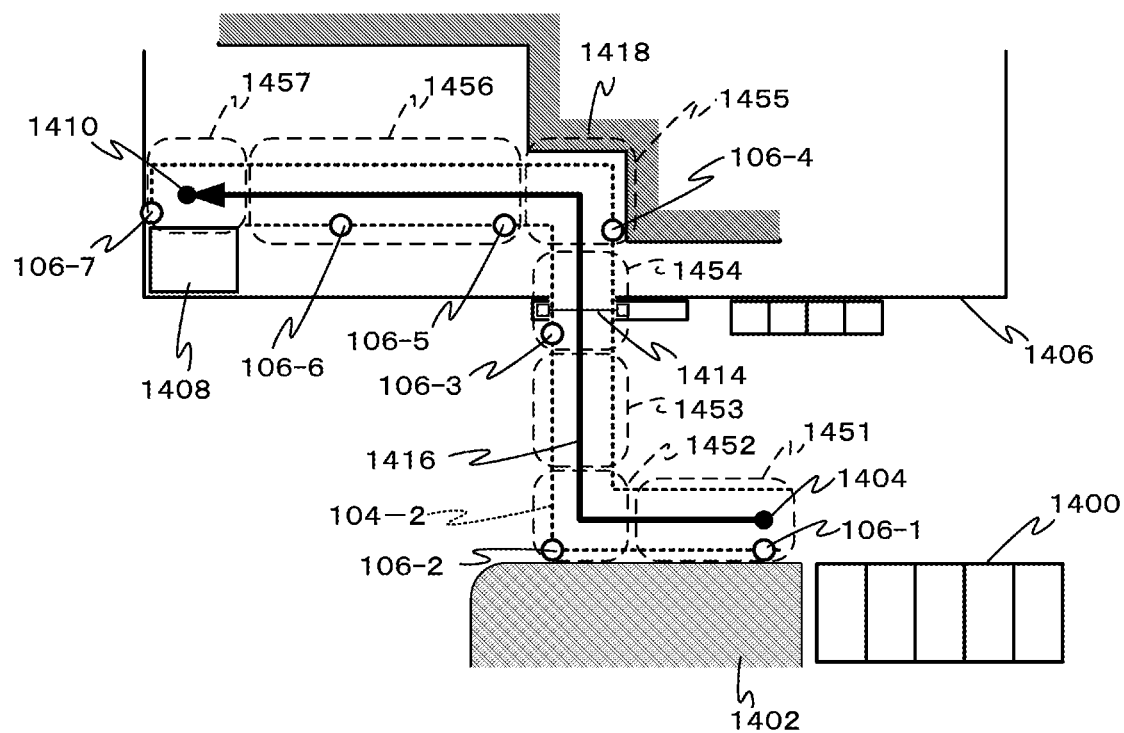
FIG. 14 is an explanatory view for explaining an example of the working mode operation in the present movable body control system.

FIG. 14 is an explanatory view for explaining an example of the working mode operation. In the illustrated example, a predetermined guidance start position 1404 is provided in a portion where a curbstone 1402 at a left side illustrated in the drawing of a parking lot 1400 starts. Further, a beacon transmitter 106-1 is disposed at a side of the curbstone 1402 in a vicinity of the guidance start position 1404.

A traveling road 104-2 (dotted line illustrated in the drawing) is provided from the guidance start position 1404 to an elevator front position 1410, and beacon transmitters 106-2, 106-3, 106-4, 106-5, 106-6 and 106-7 are placed along the traveling road 104-2. The traveling road 104-2 extends in a left direction illustrated in the drawing from the guidance start position 1404, turns to the right at a position of the beacon transmitter 106-2, passes through an entrance 1414 where the beacon transmitter 106-3 is placed, turns to the left in a vicinity of a place where the beacon transmitter 106-4 is installed just before a wall 1418 present ahead in a traveling direction, thereafter goes straight in a part where the beacon transmitters 106-5 and 106-6 are placed, and reaches the elevator front position 1410 where the beacon transmitter 106-7 is placed.

Further, the traveling road 104-2 is divided into an area 1451 of "a straight road without a wall on both sides", an area 1452 of "a corner road without a wall ahead", an area 1453 of "a straight road without a wall on both sides", an area 1454 of "a straight road with an obstacle at a side", an area 1455 of "a corner road with a wall ahead", an area 1456 of "a straight road without a wall on both sides", and an area 1457 of "a straight road with a wall ahead" which are illustrated by broken lines in the drawing.

Information on disposition of a building 1406, the traveling road 104-2 and the like illustrated in FIG. 14, and information on the area 1451 and the like are stored in advance in the map information 450 included by the server 110, respective transmission frequencies and disposition positions of the beacon transmitters 106-1 etc. are stored in the beacon information 452. Further, the movable body 102 and the server 110 are operated in the aforementioned learning mode, prior to the working mode operation, whereby models about the areas 1451 etc. are generated, and are stored in the model DB 454 of the server 110.

When the user moves the movable body 102 to the guidance start position 1404, and turns on the travel switch 214 included by the input device 210 of the movable body 102, the movable body 102 and the server 110 starts the aforementioned working mode operation. When the user inputs the elevator front position 1410 in front of an elevator 1408 of the building 1406 as a destination by using the input device 210 of the movable body 102, destination information showing the destination is transmitted to the server 110.

Figure 11:
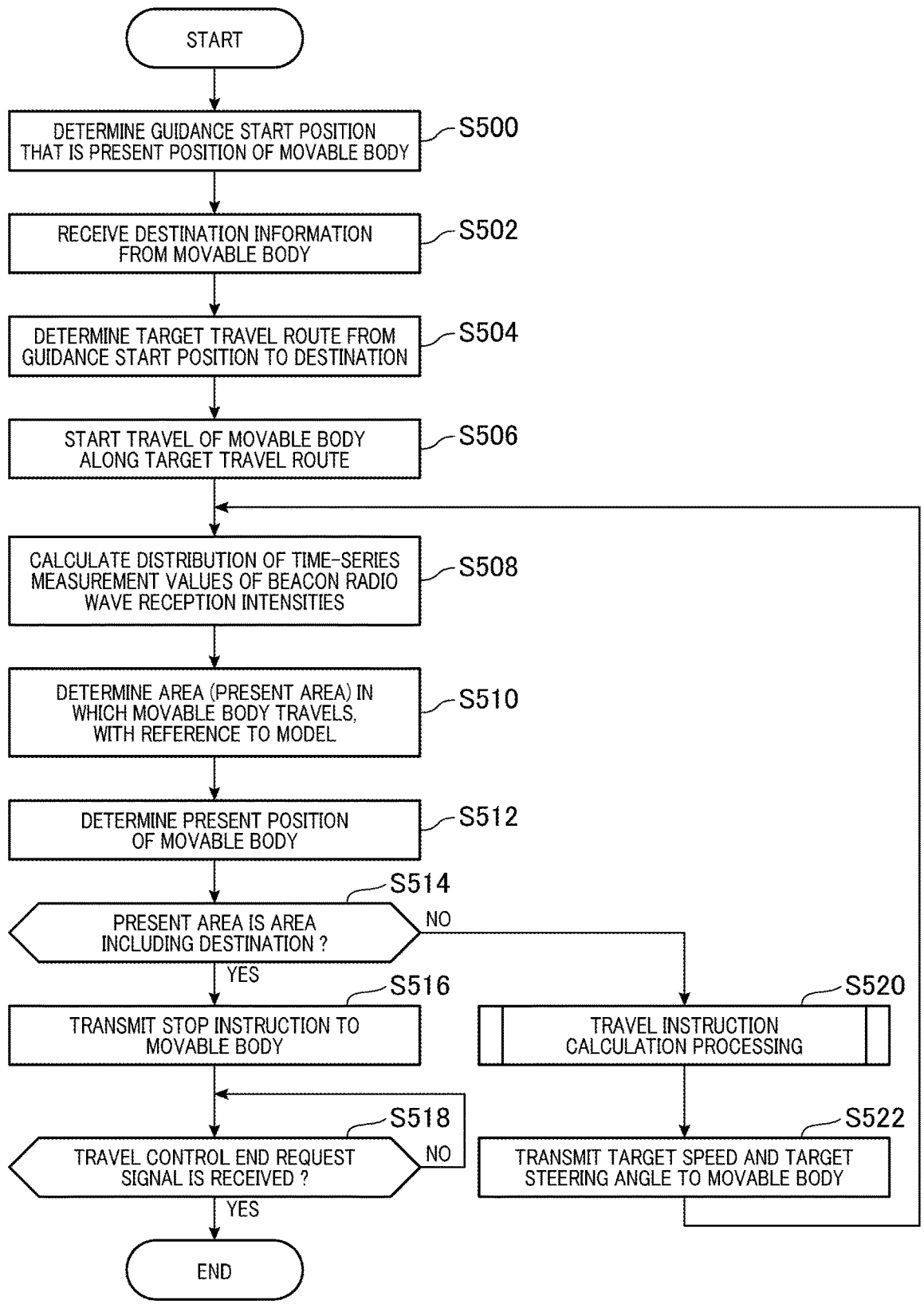
FIG. 11 is a flowchart illustrating a process of travel control processing that is executed in the working mode operation by the server in the present movable body control system.

The server 110 detects that reception intensity of the radio wave of the beacon transmitter 106-1 is the highest from the beacon reception information received from the movable body 102, and confirms that the present position of the movable body 102 is the guidance start position 1404 in the vicinity of the beacon transmitter 106-1 (step S500 in FIG. 11). The server 110 determines a target travel route 1416 from the guidance start position 1404 to the elevator front position 1410 based on the destination information received from the movable body 102 (steps S502 and S504 in FIG. 11).

Subsequently, the server 110 starts travel of the movable body 102 along the target travel route 1416 by transmitting a target speed and a target steering angle to the movable body control device 108 of the movable body 102 (step S506 in FIG. 11). Further, the server 110 receives the beacon information, the surrounding image information and the odometry information at predetermined time intervals from the movable body 102 as the movable body 102 travels.

Subsequently, as the movable body 102 travels, the server 110 determines as the present area the areas 1451, 1452, . . . , and the like in succession where the movable body 102 travels, on the basis of the distributions (time-radio wave reception intensity distributions) of the time-series measurement values of the beacon radio wave reception intensity calculated based on the beacon reception information received from the movable body 102 and on the basis of the models (steps S508 and S510 in FIG. 11). And, the server 110 determines the present position of the movable body 102 in succession based on the determined area, and the surrounding image information and the odometry information (step S512 in FIG. 11). Then, the server 110 calculates the target speed and the target steering angle at predetermined time intervals based on the information on the target travel route 1416, the above described determined present position of the movable body 102, and the class (expression of the three-dimensional shape features of the respective areas such as presence of the wall ahead in the traveling direction, for example) which are associated with the above described determined areas, and the like, and the server 110 controls travel of the movable body 102 (steps S520 and 522 in FIG. 11).

Further, when the above described determined present area is an area including the elevator front position 1410 which is the destination (step S514 in FIG. 11, Yes), the server 110 transmits a stop instruction to the movable body 102 (step S516 in FIG. 11), and thereafter, waits for reception of the travel control end request signal from the movable body 102 and ends the travel control processing (step S518 in FIG. 11).

Modification Example

Next, a modification example of the movable body control system 100 will be described.

In the aforementioned embodiment, the movable body 102 is assumed to be an electric wheelchair as an example. However, as described above, the movable body configuring the movable body control system according to the present invention is not limited to this, and can be widely and generally any kind of movable body including a drive device and a steering device, such as an automobile, an electric cart, and an electric truck in a factory or the like.

Hereinafter, an example utilizing a movable body 102' that is an automobile and can be used in place of the aforementioned movable body 102 which is an electric wheelchair will be described.

Figure 15:
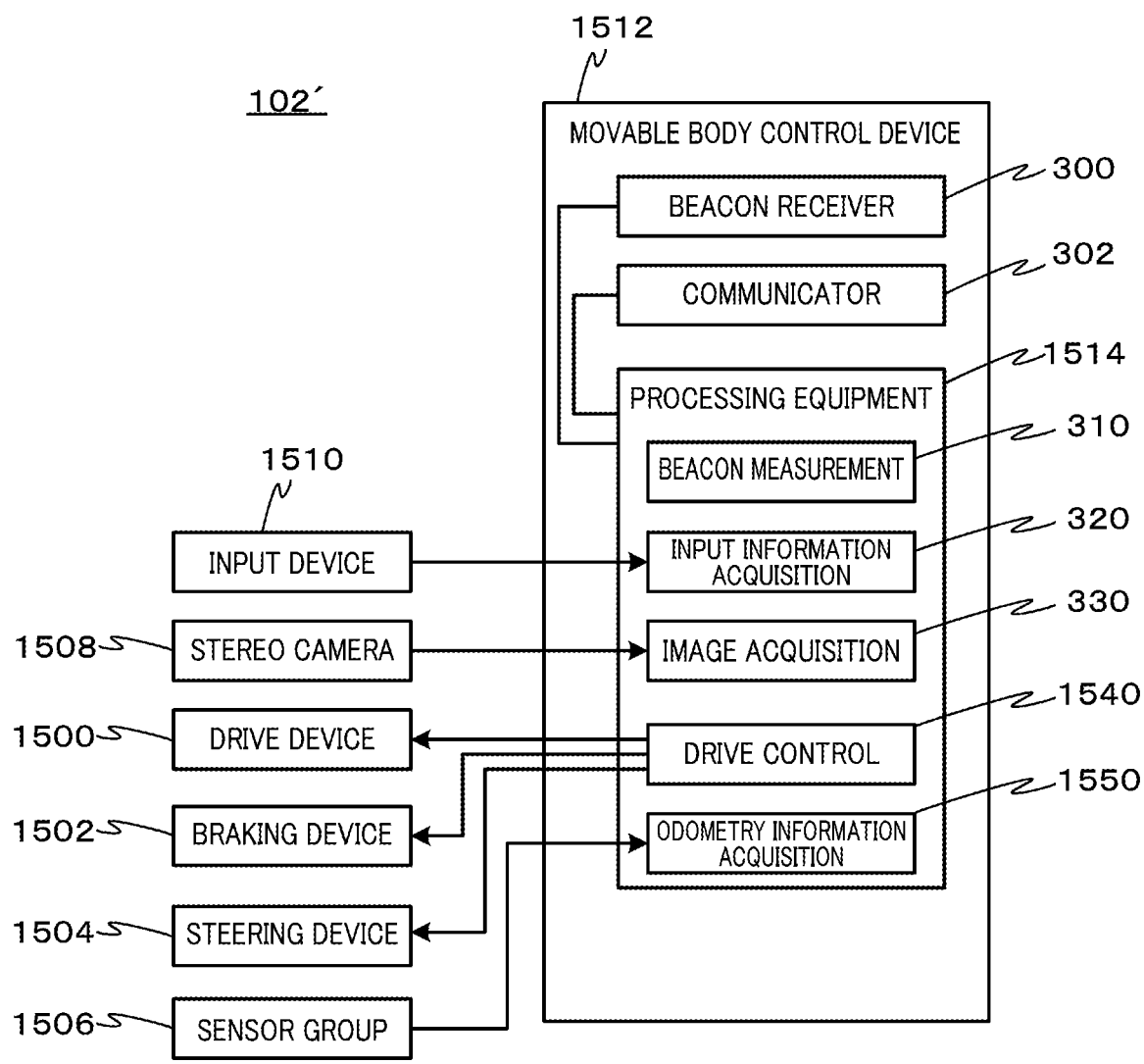
FIG. 15 is a block diagram illustrating a configuration of a movable body which is an automobile that can be used in the present movable body control system.

FIG. 15 is a block diagram illustrating a configuration of the movable body 102' which is an automobile. In FIG. 15, the same reference signs as the reference signs in FIG. 3 are used for the same components as the components of the movable body 102 illustrated in FIG. 3, and explanation about FIG. 3 described above is applied to the same components.

The movable body 102' includes a drive device 1500 that drives wheels, a braking device 1502, a steering device 1504, and a sensor group 1506. The sensor group 1506 includes a speed sensor, a travel distance sensor, a yaw rate sensor and the like. Further, the movable body 102' includes a stereo camera 1508, an input device 1510 for an occupant to input an instruction and data, and a movable body control device 1512.

Figure 16:
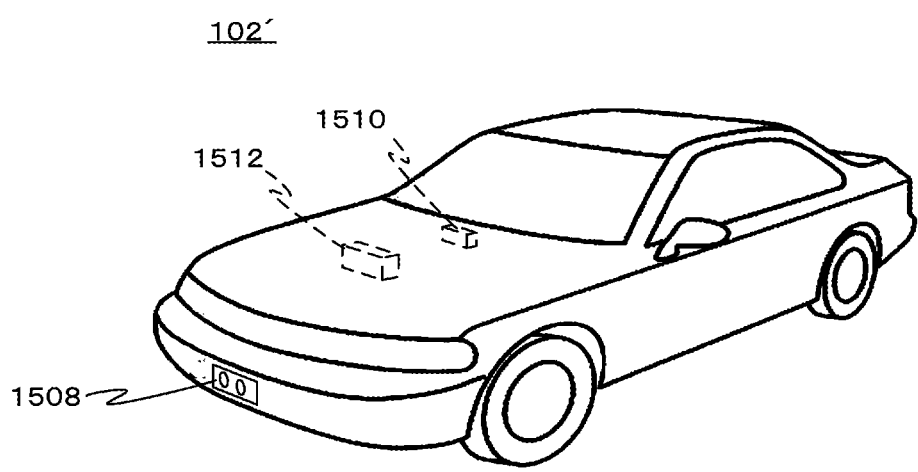
FIG. 16 is a view illustrating an example of disposition of a stereo camera and the like in the movable body illustrated in FIG. 15.

FIG. 16 is a view illustrating an example of disposition of the stereo camera 1508, the input device 1510, and the movable body control device 1512, in the movable body 102'. The stereo camera 1508 is provided in a vicinity of a front bumper, for example, and captures an image of an environment in front of the movable body 102'. Further, the movable body control device 1512 is configured as one electronic control unit (ECU, Electronic Control Unit) included in the movable body 102' which is an automobile, for example, and may be placed in its engine room. Further, the input device 1510 is placed in its passenger compartment as a part of an on-vehicle navigation apparatus, for example.

The movable body control device 1512 has a similar configuration to the configuration of the movable body control device 108 illustrated in FIG. 3, but differs in a point that the movable body control device 1512 does not include the motor drive device 306, and includes processing equipment 1514 in place of the processing equipment 304.

The processing equipment 1514 has a similar configuration to the configuration of the processing equipment 304, but differs in a point that the processing equipment 1514 has a drive control unit 1540 and an odometry information acquisition unit 1550 in place of the drive control unit 340 and the odometry information acquisition unit 350.

The drive control unit 1540 and the odometry information acquisition unit 1550 are realized by executing the processing equipment 1514 which is a computer executing programs, similarly to the beacon measurement unit 310, the input information acquisition unit 320 and the like. In place of this, or in addition to this, all or one part of the drive control unit 1540 and of the odometry information acquisition unit 1550 can be each configured by hardware including one or more electronic circuit components.

The drive control unit 1540 controls the drive device 1500, the braking device 1502, and the steering device 1504 in accordance with the target speed and the target steering angle which are transmitted from the server 110, and causes the movable body 102' to travel. Further, when the drive control unit 1540 receives a stop instruction from the server 110, the drive control unit 1540 controls the drive device 1500 and the braking device 1502 to stop travel of the movable body 102'.

The odometry information acquisition unit 1550 calculates a traveling direction and a travel distance of the movable body 102' based on sensor outputs from respective sensors configuring the sensor group 1506, at predetermined time intervals, and transmits the traveling direction and the travel distance which are calculated, to the server 110 as the odometry information.

Figure 17:
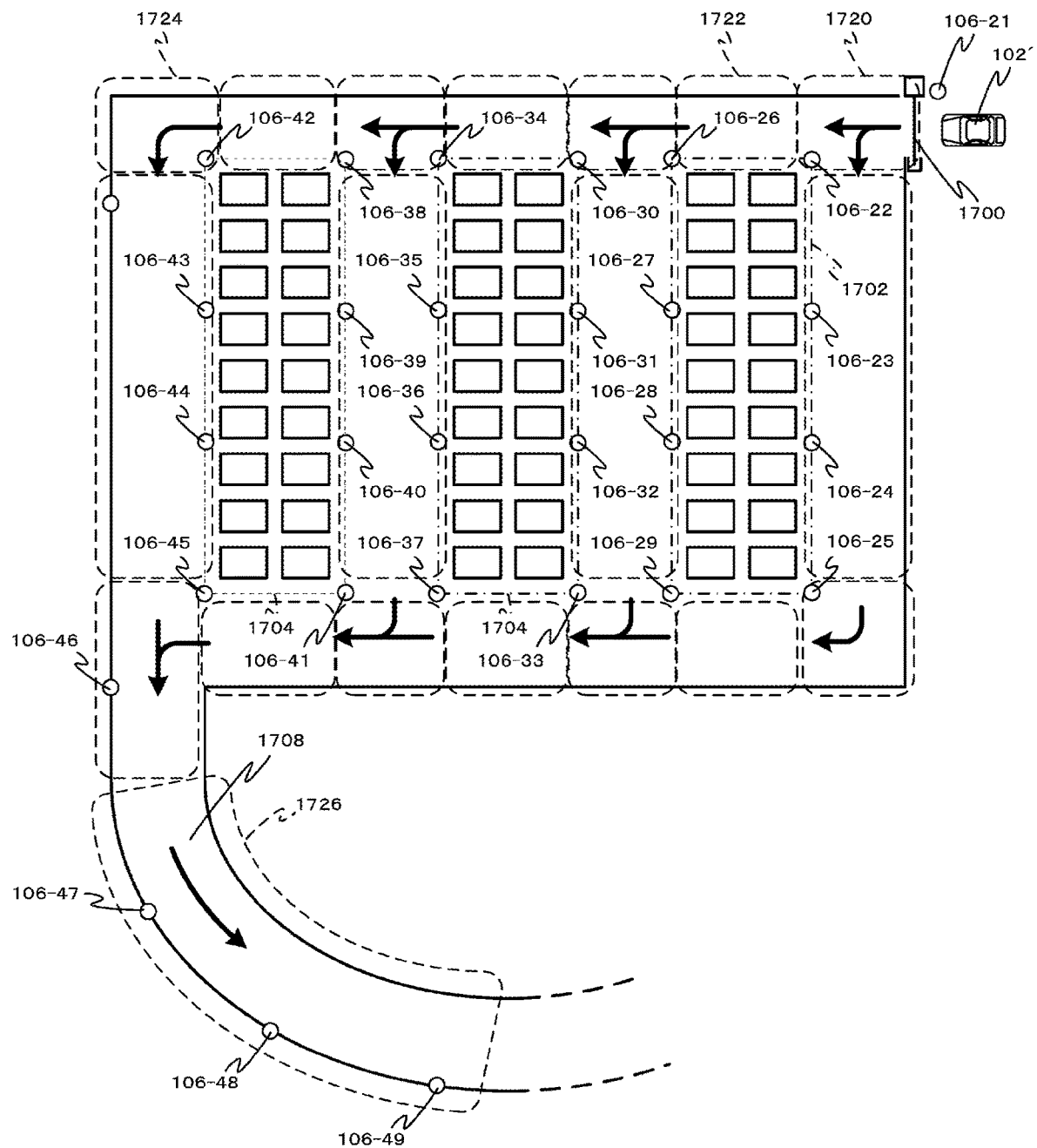
FIG. 17 is an explanatory view for explaining an example of a scene where the movable body illustrated in FIG. 15 is used.

FIG. 17 is an explanatory view for explaining an exemplary scene in a parking garage (i.e., parking lots in a building) where the movable body 102' that configures the movable body control system 100 is used. The parking garage has a plurality of floors and FIG. 17 illustrates one parking lot floor of the parking garage. The movable body 102' which is an automobile enters from an entrance gate 1700. This floor has three parking areas 1702, 1704 and 1706 each shown by an enclosing dot-dash line in the figure and each of the parking areas includes 18 parking spaces. And this floor includes a moving path 1708 which is configured by a curve road for moving to another parking lot floor and which corresponds to a part of the traveling road 104 illustrated in FIG. 1.

A beacon transmitter 106-21 is disposed just before the entrance gate 1700, and beacon transmitters 106-22 to 106-45 are disposed around the parking areas 1702, 1704 and 1706, as illustrated in the figure. In addition, the beacon transmitters 106-46 to 106-49 are disposed along the moving path 1708.

Further, traveling roads (as a part of the traveling road 104 illustrated in FIG. 1) for the movable body 102' are provided along and/or between the parking areas 1702, 1704 and 1706. The traveling roads are divided into a plurality of areas as shown by broken lines in the figure and each of the plurality of areas is stored in the map information 450 in the server 110, associated with a class expressing shape features of the each of the plurality of areas. For example, an area 1720 is stored, associated with a class of "a branch road turnable to the left, with a wall at a right side". An area 1722 is stored, associated with a class of "a straight road with a wall at a right side, and a no-entry area at a left side". An area 1724 is stored, associated with a class "a corner road with a wall ahead". And an area 1726 is stored, associated with a class of "a curve road with walls at a left and right sides".

In the model DB 454 of the server 110, models for the respective areas shown by broken lines in the figure are stored, by the learning mode operation being executed in advance.

In this exemplary scene, also on another floor to which the moving path 1708 is connected, parking spaces and a traveling road which are similar to those in FIG. 17 are assumed to be configured, and divided into similar areas, and information on and models of the divided areas are assumed to be stored by the server 110. Further, the server 110 is assumed to acquire information on which parking space on which floor is vacant by a known method in the field of a parking management system (for example, from an image from a camera capturing the respective parking areas 1702 and the like).

In the above described configuration, when an occupant in the movable body 102' stops the movable body 102' before the entrance gate 1700 (a position of the movable body 102' shown in the figure), and turns on the travel switch (not illustrated) of the input device 1510 included in the movable body 102', the server 110 and the movable body control device 1512 of the movable body 102' start the working mode operation.

The server 110 confirms that the movable body 102' is located at the position of the entrance gate 1700 closest to the beacon transmitter 106-21 by the beacon reception information from the movable body 102', and determines a target travel route from the entrance gate to a vacant parking space. Thereafter, the server 110 receives the beacon reception information, the surrounding image information and the odometry information at predetermined time intervals from the movable body 102', determines the area by using the model stored in the model DB 454, and causes the movable body 102' to travel to a front of the vacant parking space as the target along the target travel route while determining the present position of the movable body 102' continuously. After that, the server 110 ends the operation.

Thereafter, the movable body 102' is stopped in the vacant parking space by an occupant or by mean of an automatic parking assist system or the like included in the movable body 102', for example.

It should be noted that FIG. 17 is an example of the scene where the movable body control system 100 including the movable body 102' which is an automobile is used and the use thereof is not limited to the scene illustrated in FIG. 17. For example, the beacon transmitters 106 are placed in a tunnel, and the server 110 can control travel of the movable body 102' in the tunnel by the working mode operation. In this case, for example, an entrance and an exit of the tunnel can be used as the guidance start position and the destination, and for example, the movable body 102' can include an optical sensor for determining whether or not the movable body 102' reaches the tunnel entrance based on a change in brightness of the surrounding environment of the movable body 102' and/or a change in spectrum of light.

As described above, in the movable body control system 100 of the present embodiment, a plurality of beacon transmitters 106 are included around the traveling road of the movable body 102, and the movable body 102 acquires the reception intensity of the respective beacon radio waves at predetermined time intervals at the time of traveling. Subsequently, in the learning mode operation, for example, the server 110 generates the models for determining the areas of the traveling road on which the movable body 102 travels based on the temporal change of the reception intensity of the above described beacon radio waves acquired by the movable body 102 (for example, the aforementioned time-radio wave reception intensity distribution of the time-series measurement values of the beacon radio wave reception intensity described above) to be stored.

In the working mode operation, the movable body 102 acquires the reception intensity of the beacon radio waves at predetermined time intervals, the server 110 controls travel of the movable body 102 autonomously along the target travel route while determining the area in which the movable body 102 travels at present with reference to the above described model, based on the temporal change of the beacon radio wave reception intensity calculated from the reception intensity which is acquired (for example, the time-radio wave reception intensity distribution of the time-series measurement values of the beacon radio wave reception intensity described above).

The model created from the time-series data of the beacon radio wave reception intensity as described above is such that focus on the temporal change of the reception intensity of the beacon radio wave, and therefore, does not depend on variation in the reception sensitivity of beacon radio waves among the movable bodies 102. Consequently, by using the model commonly in a plurality of arbitrary movable bodies 102, travel of these movable bodies 102 can be autonomously controlled.

Further, the temporal changes of the radio wave reception intensities of the respective beacon radio waves appear as the result of the three-dimensional shape features such as presence of a wall in the area where the movable body 102 is traveling at present (in particular, as the result of a radio wave interference and the like due to the shape features), so that the model which is generated as described above includes the information on the three-dimensional shape features in the area.

Further, by determining the areas by using these models, entry into the areas and approach to an obstacle such as a wall can be detected earlier as compared with the prior art which performs position determination based on whether or not the reception intensity of the beacon radio wave is equal to or larger than a threshold value, so that deceleration or the like is performed earlier and the movable body 102 can be caused to travel smoothly.

In the aforementioned embodiment and modification example, the input devices 210 and 1510 can be multi-function mobile terminals having communication functions, such as a smartphone and a portable PC. Further, when a multi-function mobile terminal, an on-vehicle navigation apparatus and the like are used as the input devices 210 and 1510, maps may be displayed on display devices with touch panels or the like included by the multi-function mobile terminal, the on-vehicle navigation apparatus and the like.

In this case, the user inputs the present position and the destination of the movable body 102 on the displayed map, and can perform the learning mode operation and the working mode operation with the present position set as the guidance start position. Further, in this case, the user inputs the area on the map displayed in the above described display device in the learning mode operation, whereby the information on the inputted area is transmitted to the server 110, and based on the information, the area (the present area) in which the movable body 102 travels at present can be determined in the model generation unit 416.

Further, in the above described embodiment, the three-dimensional shape features such as presence of a wall in the present area is determined based on the classes of the respective areas which are stored in advance in the map information 450. However, as described above, the time-radio wave reception intensity distribution acquired in each of the areas appears as the result of the three-dimensional shape features such as presence of a wall in the area (that is, the result of radio wave interference or the like due to the shape features like this). Accordingly, instead of storing the class of each of the areas in the map information 450 in advance as in the present embodiment, the three-dimensional shape features such as presence or absence of a wall in the area is grasped from the characteristic distribution condition of the time-radio wave reception intensity distribution expressed by the model in each of the areas, and the working mode operation can be performed based on the grasped three-dimensional shape features.

Further, the units included in the processing equipment 402 of the server 110 and the functions that the units have may be included in anywhere of the movable body control system 100 (that is, the server 110 or the movable body 102), and, for example, some of the units included by the processing equipment 402 of the server 110 or some of the functions of the units may be included in the processing equipment 304 of the movable body 102.

For example, the processing equipment 402 generates a model and only distributes the generated model to the movable body 102 without performing travel control of the movable body 102, and the movable body control devices 108 of the respective movable bodies 102 respectively receive the distribution of the above generated model (for example, distribution of the model about the area around at least the place where the movable body 102 is traveling at present) and may perform travel control of the corresponding movable bodies 102. In this case, the present position determination unit 418 and the travel control unit 420 may be present in the processing equipment 304 instead of in the processing equipment 402, and further the movable body 102 may include the storage device that stores the map information 450, the beacon information 452, and the model DB 454.

In the aforementioned embodiment, the beacon receiver 300 configures beacon reception means, and the model generation unit 416 configures model generation means. Further, the present position determination unit 418 and the travel control unit 420 configure travel control means, and the storage device 404 configures storage means. Further, the image recognition unit 414 configures detection means that detects an obstacle present in a surrounding environment of the movable body 102.

REFERENCE SIGNS LIST

100 . . . Movable body control system, 102, 102' . . . Movable body, 104 . . . Traveling road, 106 . . . Beacon transmitter, 108, 1512 . . . Movable body control device, 110 . . . Server, 200 . . . Left drive wheel, 202 . . . Right drive wheel, 204 . . . , Left drive motor, 206 . . . Right drive motor, 208, 1508 . . . Stereo camera, 210, 1510 . . . Input device, 212 . . . Learning switch, 214 . . . Travel switch, 216 . . . Destination selection switch, 300 . . . Beacon receiver, 302, 400 . . . Communicator, 304, 402, 1514 . . . Processing equipment, 306 . . . Motor drive device, 310 . . . Beacon measurement unit, 320 . . . Input information acquisition unit, 330 . . . Image acquisition unit, 340, 1540 . . . Drive control unit, 350, 1550 . . . Odometry information acquisition unit, 404 . . . Storage device, 410 . . . Start position determination unit, 412 . . . Route determination unit, 414 . . . Image recognition unit, 416 . . . Model generation unit, 418, . . . Present position determination unit, 420 . . . Travel control unit, 450 . . . Map information, 452 . . . Beacon information, 454 . . . Model DB, 510 to 514, 1451 to 1457, 1720 to 1726 . . . Area, 530, 1418 . . . wall, 1400 . . . Parking lot, 1402 . . . Curbstone, 1404 . . . Guidance start position, 1406 . . . Building, 1408 . . . Elevator, 1410 . . . Elevator front position, 1414 . . . Entrance, 1416 . . . Target travel route, 1500 . . . Drive device, 1502 . . . Braking device, 1504 . . . Steering device, 1506 . . . Sensor group, 1700 . . . Entrance gate, 1702, 1704, 1706 . . . Parking area, 1708 . . . moving path

What is claimed is:

1. A movable body control system for controlling travel of a movable body, comprising:
 a plurality of beacon transmitters disposed around a traveling road on which the movable body travels;
 at least one movable body including a beacon receiver for receiving beacon radio waves from the plurality of beacon transmitters; and
 at least one processing equipment configured to:
 generate a model for determining a position of the movable body based on beacon radio wave reception intensities of the beacon radio waves which the beacon receiver receives from the plurality of beacon transmitters, wherein the model is for determining an area in which the movable body travels based on a distribution of time-series measurement values of the beacon radio wave reception intensities; and
 to control the travel of the movable body while determining an area in which the movable body travels at present, based on a distribution of the time-series measurement values at present of the beacon radio wave reception intensities and the model.

2. The movable body control system according to claim 1, further comprising:
 a storage device for storing map information including information on a route of the traveling road and a three-dimensional shape of surroundings including the traveling road,
 wherein the map information includes information on areas obtained by dividing the traveling road based on three-dimensional shape features of the surroundings, and information on the three-dimensional shape features about the areas, and
 the processing equipment is configured to control the travel of the movable body based on the information on the three-dimensional shape features about the areas.

3. The movable body control system according to claim 1, wherein the processing equipment is configured to control the travel of the movable body based on information on an obstacle present in a surrounding environment of the movable body.

4. The movable body control system according to claim 1, wherein the model is used in the arbitrary movable body different from the movable body which is used in generation of the model, and travel of the arbitrary movable body is controlled.

5. The movable body control system according to claim 1, wherein the processing equipment is configured to control the travel of the movable body on a basis of odometry based on a travel distance and a traveling direction of the movable body.

6. The movable body control system according to claim 1, wherein the processing equipment is configured to plan a speed of the movable body and/or a change rate of the speed so that acceleration, deceleration and/or jerk of the movable body do not exceed predetermined upper limit values respectively, and to determine a target speed of the movable body in accordance with the plan.

7. The movable body control system according to claim 1, wherein the movable body is an automobile.

8. The movable body control system according to claim 1, wherein the movable body is a wheelchair.

9. A movable body control method for controlling travel of a moveable body having a beacon receiver for receiving beacon radio waves from a plurality of beacon transmitters disposed around a traveling road on which the movable body travels, the movable body control method comprising the steps of:
 generating, by at least one processing equipment, a model for determining a position of the movable body based on beacon radio wave reception intensities of the beacon radio waves from the plurality of beacon transmitters, which are received by the beacon receiver, wherein the model is for determining an area in which the movable body travels based on a distribution of time-series measurement values of the beacon radio wave reception intensities;

receiving the beacon radio waves from the plurality of beacon transmitters by the beacon receiver;

determining, by the processing equipment, the area in which the movable body travels at present by the travel control means, based on the distribution of the time-series measurement values of present beacon radio wave reception intensities that are reception intensities of the beacon radio waves from the plurality of beacon transmitters which are received in the receiving step, and the model; and controlling, by the processing equipment, travel of the movable body, based on the area where the movable body travels at present and which is determined by the determining step.

10. The movable body control method according to claim 9, wherein, in the step of controlling the travel of the movable body, by using map information including information on a route of the traveling road and three-dimensional shapes of surroundings including the traveling road, information on areas obtained by dividing the traveling road based on three-dimensional shape features of the surroundings, and information on the three-dimensional shape features about the areas, the travel of the movable body is controlled based on the information on the three-dimensional shape features about the areas.

11. The movable body control method according to claim 9, wherein, in the step of controlling the travel of the movable body, the travel of the movable body is controlled based on information on an obstacle detected in a surrounding environment of the movable body.

12. The movable body control method according to claim 9, wherein the model is used in the arbitrary movable body different from the movable body which is used in generation of the model, and travel of the arbitrary movable body is controlled in the step of controlling the travel of the movable body.

13. The movable body control method according to claim 9, wherein in the step of controlling the travel of the movable body, the travel of the movable body is also controlled on a basis of odometry based on a travel distance and a traveling direction of the movable body.

14. The movable body control method according to claim 9, wherein in the step of controlling the travel of the movable body, a speed of the movable body and/or a change rate of the speed are/is planned so that acceleration, deceleration and/or jerk of the movable body do not exceed predetermined upper limit values respectively, and a target speed of the movable body is determined in accordance with the plan.

15. The movable body control method according to claim 9, wherein the movable body is an automobile.

16. The movable body control method according to claim 9, wherein the movable body is a wheelchair.

* * * * *